(12) United States Patent
Guscho

(10) Patent No.: US 7,414,768 B2
(45) Date of Patent: Aug. 19, 2008

(54) ELECTRO-OPTICAL TRANSDUCER AND JELLY LAYER THEREFOR, METHOD FOR PRODUCING A JELLY LAYER AND A COMPOUND FOR CARRYING OUT SAID METHOD

(76) Inventor: Yury Petrovich Guscho, Novojasenevsky pr., d. 14, kor.2, kv.442, Moscow 117574 (RU)

( * ) Notice: Subject to any disclaimer, the term of this patent is extended or adjusted under 35 U.S.C. 154(b) by 345 days.

(21) Appl. No.: 10/540,417

(22) PCT Filed: Dec. 3, 2003

(86) PCT No.: PCT/RU03/00535

§ 371 (c)(1),
(2), (4) Date: Mar. 2, 2006

(87) PCT Pub. No.: WO2004/059372

PCT Pub. Date: Jul. 15, 2004

(65) Prior Publication Data

US 2006/0209379 A1    Sep. 21, 2006

(30) Foreign Application Priority Data

Dec. 27, 2002    (RU) ............................ 2002135350

(51) Int. Cl.
*G02F 1/03* (2006.01)
*G02F 1/00* (2006.01)

(52) U.S. Cl. ....................................... 359/245; 359/321

(58) Field of Classification Search ......... 359/245–246, 359/254, 259, 264, 247, 263, 278–279, 269, 359/271, 315–316, 318, 290–291, 295
See application file for complete search history.

(56) References Cited

U.S. PATENT DOCUMENTS

| 5,135,630 | A | 8/1992 | Goldburt et al. | ........ 204/192.14 |
| 5,432,280 | A | 7/1995 | Hara et al. | .................. 524/730 |
| 5,822,110 | A | 10/1998 | Dabbaj | ...................... 359/293 |
| 6,476,848 | B2 * | 11/2002 | Kowarz et al. | .............. 347/255 |

FOREIGN PATENT DOCUMENTS

| EP | 1580592 | 9/2005 |
| RU | 2 031 624 | 3/1996 |
| RU | 2 080 641 | 5/1997 |
| SU | 678 519 | 8/1979 |
| WO | 01/048531 | 7/2001 |
| WO | 2004/059372 | 7/2004 |

OTHER PUBLICATIONS

Alekhin et al., "Calculation of the value of the luminous efficiency when reproducing relief recordings by Schlieren optics with circular irises," Optical Spectroscopy (USSR), 43(5): 578-581 (1977).
Alekhin et al., "Optical characteristics of phase-relief recording with signal recording from the side of the substrate," Optical Spectroscopy 52(1): 61-63 (1982).
Alekhin, V.A., "Calculation of the optical parameters of a cylindrical schlieren projector," Soviet Journal of Optical Technology 52(7): 403-405 (1985).
Alekhin, V.A., "Characteristics of Multichannel Phase Reliefographic Light Modulators," Avtometriya No. 1 : 38-43 (1990).
Derwent English Abstract for Russian Patent Application RU 2031624, published Mar. 27, 1995, entitled: "Relief-graphic information recording device—has 2nd electro-conductive layer applied onto base from side of gas gap and uses moving carrier to record digital-symbol information and 1/2 tone image".
Derwent English Abstract for Russian Patent Application RU 2080641, published May 27, 1997, entitled: "Television projector—has sources for pass voltage to control electrodes, producing pondermotive forces and deformation of free surfaces of gel layer".
Derwent English Abstract for Soviet Union Patent Application SU 678519, published Aug. 5, 1979, entitled: "TV signals optical recording and playback medium—has control signal sources connected to transparent ribbon electrodes on glass plate and connected to transparent conducting layer".

English abstract of PCT Patent Application WO 2004/059372, published Jul. 15, 2004, entitled "Electro-optical transducer and jelly layer therefore, method for producing a jelly layer and a compound for carrying out said method".

INSPEC Abstract No. A91053450, B91025248, English abstract of: Alekhin, V.A., "Characteristics of multichannel phase reliefographic light modulators," Avtometriya No. 1, pp. 38-43 (1990).

Gushcho et al., "A large-screen laser projector based on light modulation in a gel-like deformable layer," Journal of the Moscow Physical Society 7: 351-361 (1997).

* cited by examiner

*Primary Examiner*—Scott J. Sugarman
*Assistant Examiner*—Dawayne A Pinkney
(74) *Attorney, Agent, or Firm*—Bell, Boyd & Lloyd LLP; Stephanie Seidman; Frank J. Miskiel

(57) ABSTRACT

The electrooptical converter comprises sequentially located on the optical axis: at least one optical lighter, a transparent support or M transparent supports, each in the form of at least one plane-parallel plate or at least one prism of total internal reflection, at least one line modulator, at least one visualizer, a perception device, and at least one control device. Each line modulator comprises a transparent electroconducting layer applied to the transparent support, the electroconducting layer being covered with a transparent gel-like layer, and a system of i parallel ribbon control electrodes and ground electrodes, arranged in one plane on a second support corresponding to each of line modulators and located with a gap above the transparent gel-like layer and electrically connected to the corresponding control device. Each transparent support together with the corresponding at least one line modulator forms a line element. The optical lighter includes a lengthy light source and a lighting convertible lens sequentially located on the optical axis, and the visualizer includes a Fourier-objective and a visualizing diaphragm sequentially located on the optical axis. The light source is pulse or continuous. The frequency of light pulse recurrence is equal to the line frequency of the image. The ribbon control electrodes are electrically connected to the periodic structure of control teeth, and the ground electrodes are electrically connected to the periodic structure of ground teeth. For each line pixel the teeth together with the corresponding electrodes look like two conducting combs isolated from each other. The combs' teeth are located in parallel to the lengthy light source, while the location period of the pairs of the control teeth and ground teeth $\lambda_{teeth}$ is calculated from the relation: $\lambda_{teeth} \leq \sqrt{2} \lambda_{light}/\alpha_{div}$, wherein $\lambda_{light}$ is a wavelength of the lengthy light source and $\alpha_{div}$ (in radians) is a divergence of the radiation of the light source in a direction perpendicular to the combs' teeth.

52 Claims, 14 Drawing Sheets

US 7,414,768 B2

ELECTRO-OPTICAL TRANSDUCER AND JELLY LAYER THEREFOR, METHOD FOR PRODUCING A JELLY LAYER AND A COMPOUND FOR CARRYING OUT SAID METHOD

FIELD OF TECHNIQUE

The invention relates to a light modulation by methods of control of intensity and phase characteristics of a light flux with creation and use of new reliefography deformable layers. The invention can be applied in the optical-mechanical industry, television, press, communication facilities, optical fiber switching and filtering devices, fast line and matrix printers and in other fields of technique.

BACKGROUND OF THE INVENTION

An electrooptical converter containing an intermediate carrier of relief recording of a line composed of a transparent support in a form of a plane-parallel plate or a prism of total internal reflection with a transparent electroconductive layer or a transparent gel-like layer sequentially applied to it, and a system of parallel ribbon control and ground electrodes applied to a second transparent support and allocated above the gel-like layer with a gap; a block of sources of voltage signals connected to the control electrodes; an optical system of visualization of a relief information, functioning for gleam and consisting of a condenser and a cylindrical objective—an anamorphote, a visualizing diaphragm, a means for vertical scanning of the line and a screen is known (USSR Certificate of Authority 678519, Int.Cl. G11B 7/00, 1979. to Yury Guscho. Physics of reliefography. Moscow, NAUKA, 1999, p. 526). [1].

A disadvantage of the known device is the necessity of using an optics functioning for gleam which has very low relief sensitivity to electrical signals and a low contrast that does not allow receipt of an image of high enough quality. The absence of synchronization of means for vertical scanning of the line with a source of voltage signals in the known device reduces stability of the image on the screen, i.e. impairs its quality. The quality of the image is also impaired as a result of a phase noise produced by the electrodes which should be made transparent.

Another known electrooptical converter comprises an intermediate carrier of relief recording of the line composed of the transparent support in a form of a plane-parallel plate or a prism of total internal reflection with the transparent conducting layer or the transparent gel-like layer sequentially applied to it and a system of parallel ribbon control and ground electrodes applied to the second support and allocated above the gel-like layer with a gap; a block of sources of voltage signals connected to the control electrodes, a light filter, an optical system of visualization of the relief information, a visualizing diaphragm, a means for vertical scanning of the line synchronized with the source of voltage signals, and a screen (Patent RU (11) 2031624 (13) C1) [2].

A disadvantage of this known device is a necessity of usage of ribbon control and ground electrodes that restricts resolution capability of the device and therefore does not allow to receive an image of a high enough quality and a high contrast. Another disadvantage is a poor quality of semi-tone information because of the difficulties of transformation of distribution of the potential on the ribbon electrodes into distribution of illuminance on the screen.

The closest analog of the present invention is a known electrooptical converter containing three intermediate carriers of relief recording of the line, each carrier comprises a transparent support in a form of a plane-parallel plate or a prism of the total internal reflection with a transparent conducting layer and a transparent gel-like layer sequentially applied to it, and a system of parallel ribbon control and ground electrodes applied to a second support and allocated with a gap above the gel-like layer; a block of sources of voltage signals connected to the control electrodes of all three intermediate carriers of relief recording of the line; three optical systems of visualization of the relief information, each system consisting of a light source, a lighting convertible lens consisting of a cylindrical and a spherical objectives, a prism of total internal reflection and a projective convertible lens consisting of a cylindrical and a spherical objectives; two dichroic mirrors, a visualizing diaphragm, a means for vertical scanning of the line consisting of a mirror drum put on a shaft of an electromotor; a screen; a photosensor and a synchronization device, the output terminal of said device is connected to the block of sources of voltage signals, and an input terminal—to a photosensor (Patent RU 2080641 [3]; International PCT Application WO 01/48531 A3; 05.07.2001, inventor: Yury Guscho [4]).

A disadvantage of the above device is a necessity of usage of ribbon control and ground electrodes, which restricts resolution capability of the device and therefore does not allow obtaining an image of high enough quality. Another disadvantage is a poor quality of information imaging due to the lack of orientation of the control and ground electrodes with respect to the light source. Moreover, the lack of an objective after the stop diaphragm reduces operational possibilities and quality of the imaging of the electrooptical converter.

Moreover, the existing gel-like layers, methods of their production and as well as the methods of production and design of the line modulators do not meet the modern requirements.

A known gel-forming composition, which is close to the claimed one comprises a basic compound—polymer organovinylpolysiloxane—100 mass parts, a cross-linking agent—methylhydridpolysiloxan—0.5 mass parts; a component that increases adhesion—a silane compound—0.5 mass parts, a platinum catalytic agent—0.03 mass parts (U.S. Pat. No. 5,432,280; 11.07.1995; Hurogasu Harc, Masayuki Sheno) [5].

A known gel-forming composition is prepared by mixing of the components in the temperature range of from ambient temperature up to 60° C. However, this composition is characterized by a low limit of structural toughness. Therefore the composition can't be used for a preparation of high-quality and long-living gel-like light-modulating medium.

The closest analog of the composition of the present invention is the composition for obtaining a light-modulating medium consisting of a basic compound—polymer α,ω-dihydroxypolydimethylsiloxane—100 mass parts, a cross-linking agent tetraethoxysilan—7 mass parts, a plasticizing agent—a polydimethylsiloxane liquid—600 mass parts and a catalytic agent—stannum diethyldicaprylate—4 mass parts. [5]

However, the known composition does not allow to produce gel-like light-modulating_medium of sufficient durability without hermetic sealing of the volume the gel is placed in.

The following method of production of gel-like layers is used for preparation of the gel-like light-modulating medium from the prototype composition. First of all, a 10-30% solution of α,ω-dihydroxypolydimethyl-siloxane with a molecular mass of $1-2\times10^4$ g/mol in a polydimethylsiloxane liquid with a molecular mass of $0.6-1\times10^3$ g/mol is prepared. Then tetraethoxysilane acting as a cross-linking agent is added to this solution in the ratio of tetraethoxysilane to α,ω-dihydroxypolydimethylsiloxane from 0.8:1 up to 1.5:1. Then the blend is mechanically mixed during 20-40 min. The process of gelation begins instantly when the catalytic agent and the cross-linking agent are added to the blend. According to the cited invention, said process proceeds during 1-3 days. The application of the gel-like medium to the support is carried out by the following method: the transparent support covered with the transparent conducting layer is poured with a solution of the substance increasing the gel-like layer adhesion to the support. Then said transparent support is poured with the gel-like composition. The support is then covered with an additional glass plate. In the known method this additional glass plate is beforehand coated with a layer of substance decreasing adhesion of the gel-like layer. Metal, for example, chrome, aluminum or nickel, is used as said coating. The presence of a layer decreasing adhesion of the gel-like layer to the additional glass plate allows to increase the number of the layers to be separated from the additional glass plate upon its separation from the layer [4].

For realization of a constant speed of polymer cross-linking in the known method, it is proposed to carry out a chemical reaction of structuring and to expose the layer to the air after the separation of the additional glass plate in a compartment with a constant temperature within ±1.5° C. in the temperature range of from 10° C. up to 70° C. The access of moisture to the surface of the gel-like layer is necessary for final formation of a net of the polymer molecules, so the gel is to be exposed to the air with the moistness not less than 20% for 3-5 days.

A disadvantage of the above method is the usage of a metal as an anti-adhesion coat. After two-three times of use, the metal (because of its softness) is scratched and does not allow to obtain a layer of the high quality any longer. Its continuous renewal is a technologically laborious and an expensive process.

Moreover, the necessity of the strict maintenance of the temperature regime of the cross-linking reaction and particular moistness complicates the gel-like medium preparation process and accordingly the production of gel-like layers with reproducible characteristics.

The object of the present invention is an expansion of a range of applicability of the device and an improvement of the quality of imaging on the device of perception of the optical signal, as well as the preparation of a gel-like deformable medium, which is stable under the continuous exploitation, providing of the modified methods of its preparation and the forming of an optical gel-like layer in the line modulator.

SUMMARY OF THE INVENTION

The aforementioned objects are achieved by the present invention.

According to the present invention, the electrooptical converter comprises sequentially located on the optical axis: at least one optical lighter, a transparent support or M transparent supports, each in the form of at least one plane-parallel plate or at least one prism of total internal reflection, at least one line modulator, at least one visualizer, a perception device, and at least one control device, wherein each line modulator comprises a transparent electroconducting layer applied to the transparent support, the electroconducting layer being covered with a transparent gel-like layer, and a system of i parallel ribbon control electrodes and ground electrodes, arranged in one plane on a second support corresponding to each of line modulators and located with a gap above the transparent gel-like layer and electrically connected with the corresponding control device, wherein each transparent support together with the corresponding at least one line modulator forms a line element; while the optical lighter consists of a lengthy light source and a lighting convertible lens sequentially located on the optical axis, and the visualizer includes a Fourier-objective and a visualizing diaphragm sequentially located on the optical axis; the light source is pulse or continuous, and the frequency of light pulse recurrence is equal to the line frequency of the image; the ribbon control electrodes are electrically connected to the periodic structure of the control teeth, and the ground electrodes are electrically connected to the periodic structure of ground teeth, for each line pixel the teeth together with the corresponding electrodes look like two conducting combs isolated from each other, while the combs' teeth are located in parallel to the lengthy light source, while the location period of the pairs of the control teeth and ground teeth $\lambda_{teeth}$ is calculated from the relation: $\lambda_{teeth} \leq \sqrt{2\lambda_{light}/\alpha_{div}}$, wherein $\lambda_{light}$ is a wavelength of the lengthy light source and $\alpha_{div}$ (in radians) is a divergence of the radiation of the light source in a direction perpendicular to the combs' teeth, and the gel-like layer is made on the base of polyvinylsiloxane $(CH_2=CH)_3SiO\,[(CH_3)_2SiO]_m Si(CH=CH_2)_3$ with molecular mass of 10000-16000 and viscosity of 800-1000 centistokes, oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes.

At least one cylindrical objective which generatrix is parallel to the combs' teeth can be inserted into the lighting convertible lens.

The visualizer can contain at least one cylindrical objective which generatrix is parallel to the combs' teeth.

The perception device can contain a projection lens, a system of mirrors, a means for vertical scanning of a line, a screen, a photosensor of a scanner, while the toroidal-cylindrical objective is inserted into the projection lens.

The control device can consist of the synchronization device which output is connected to the block of sources of voltage signals, and its input is connected to the photosensor of the scanner; the base voltage source which is located between the transparent electroconducting layer and the ground electrodes; the block of sources of voltage signals connected to i inputs of the control electrodes of the line modulator; a bias voltage source connected via electric source of corrections of the time front of relief formation by one output to the like outputs of the block of sources of voltage signals, and by the other output—to the ground electrodes; while the synchronization device has two additional outputs, one of which is connected to the light source, and the other—to the means of scanning of the line, and also has an additional input from the block of sources of voltage signals, while the electric source of corrections of the time front of relief formation is inserted sequentially with the bias voltage source and connected to the synchronization device, which at the moment of powering up the pulse signal applies an additional pulsing bias voltage of the time determined form, and a commutator switching polarity of a signal on the ribbon control and ground electrodes according to the given time-space rule is connected to the block of sources of voltage signals and to the synchronization device.

The system of the parallel ribbon control and ground electrodes can be applied to the second support and can be covered with a thin dielectric layer of a uniform thickness to which the combs' control teeth and ground teeth parallel to the lengthy light source are applied perpendicularly to the ribbon control and ground electrodes, and the control teeth are electrically connected by the contacts with the corresponding ribbon control electrodes, and the ground teeth are electrically connected by the contacts with the corresponding ribbon control electrodes, wherein the butt-ends of the teeth of one pixel are located opposite to butt-ends of the teeth of the other pixel with a gap, the teeth are covered with a thin protective dielectric layer with adjustable electric parameters.

The system of the parallel ribbon control and ground electrodes can be also applied to the second support and can be covered with a thin dielectric layer of a uniform thickness to which the combs' ground teeth are applied electrically connected by the contacts with the corresponding ribbon ground electrodes and are covered with the second thin protective dielectric layer of a uniform thickness, to which the combs' control teeth are applied, the control teeth are electrically connected by the contacts with the corresponding ribbon control electrodes, while in each pixel the butt-ends of the teeth are located opposite to spaces between the butt-ends of the neighbor pixel.

The perception device can contain a projection lens, a system of mirrors, a means for vertical scanning of a line; the device contains the red, green and blue optical lighters and three control devices, corresponding to red, green and blue optical lighters and connected electrically by the outputs with the color commutator connected by one output to each line modulator, by three outputs—to three optical lighters sequentially switched on by it, and by the fifth output—to the means of scanning, the transparent support in made in the form of at least one triangular prism of total internal reflection, each line element contains three line modulators to be switched on simultaneously, each modulator has the corresponding period of order of the pairs of control teeth and ground teeth $\lambda_{teeth}$ for each of three colors, three optical lighters are arranged in parallel to each other, and the light flux of the corresponding color falls perpendicularly to the corresponding line modulator, while the light flux with the greater wavelength is directed to the line modulator, located on a greater distance from the Fourier-objective, while opaque visualizing diaphragm blocks or transmits radiation of the zero order of all three colors.

The claimed device can contain red, green and blue optical lighters and three control devices, corresponding to red, green and blue optical lighters and connected electrically by the outputs with the color commutator connected by one output to each line modulator, by three outputs—to three optical lighters sequentially switched on by it, and by the fifth output—to the means of scanning, each line element contains three line modulators with three various spatial periods of order of pairs of control teeth and ground teeth $\lambda_R$, $\lambda_G$, $\lambda_B$ corresponding to the wavelengths of light of red, green and blue optical lighters, while all three line modulators switched on sequentially in time are located on the optical axis in such a way that the line modulator with the greater wavelength is located on a greater distance from the Fourier-objective.

In the claimed device each transparent support can be made in the form of N triangular prisms with a rectangular triangle as the basis sequentially optically conjugated by the equal leg lateral sides, while the line modulators are applied to all or to some of hypotenuse lateral sides; one leg lateral side of the first prism has a free surface directed to at least one optical lighter, and one leg lateral side of the last prism has a free surface directed to at least one visualizer, while these sides are located perpendicularly to the optical axis, and the light from the optical lighter falls on all hypotenuse sides at the angle grater than the angle of total internal reflection, and the line modulators have equal or different spatial frequencies of the combs' teeth.

The device can further comprise M line elements, arranged in the form of a linear matrix, the transparent support of each of the line elements consisting of an even number of prisms, wherein the first and the last free leg lateral sides of the line elements located in parallel planes or in one plane are directed correspondingly to the matrix of M monochrome, three-colored or multi-colored optical lighters and to the matrix of M monochrome, three-colored or multi-colored visualizers correspondingly.

The perception device can be made in the form of a transparent or mat, or photosensitive, or thermo-sensitive material and can be arranged after the matrix of visualizers on the optical axis.

The lengthy light source can be designed in the form of an optical fiber or a matrix of optical fibers, connected by one side to a monochrome or polychrome laser light source of information and optically conjugated with the prism which is met first on the way of the light transmission by the other side, while each optical fiber is optically conjugated to one or several pixels of each line modulator, and the prism last met on the way of light transmission is conjugated to one visualizer or a matrix of visualizers, while the opaque visualizing diaphragm contains one hole or a matrix of holes with an aperture transmitting the zero order of light diffraction, while the objective is located on the optical axis after that hole or a matrix of holes on a distance less than the focal one, and the objective focuses light on the output optical fiber connected on the other side to the perception device of the light information, and the signal voltage can be applied to all line modulators synchronously, or in a three-phase time mode, or in a multiphase time mode, the voltage is sufficient for creation of the optimum depth of the phase modulation which is equal to 4.82 radian, and the perception device is electrically connected to the optical lighter.

The lengthy light source can be designed in the form of an optical fiber or a matrix of optical fibers, connected by one side to a monochrome or polychrome laser light source of information and optically conjugated with the prism which is met first on the way of the light transmission by the other side, while each optical fiber has an optical contact with one or several pixels of each line modulator, and the prism last met on the way of light transmission is conjugated to one visualizer or a matrix of visualizers, while the opaque visualizing diaphragm contains one hole or a matrix of holes with an aperture transmitting radiation of first and/or of other higher order of light diffraction, controlled by pixel electrodes, while the visualizer for each line modulator is designed in such a manner that the objective is located against each hole or a matrix of holes, and the objective focuses light on the output optical fiber connected on the other side to the perception device of the light information, and the signal voltage is applied to all line modulators synchronously, or in a three-phase time mode, or in a multiphase time mode, the voltage is sufficient for creation of the optimum depth of the phase modulation which is equal to 4.82 radian, and the perception device of the light information is electrically connected to the optical lighter.

The optical lighter can be arranged at an angle less than 90 degrees and the perception device can be arranged at an angle of 90 degrees to the leg lateral side of the prism of the line element first met on the way of the light transmission, and the part of the visualizing diaphragm blocking light of zero order of diffraction is covered with a mirror and located in parallel to the leg lateral sides of the prism of the line element last met on the way of light transmission, while the second perception device or the light-absorbing device is located at the side of visualizing diaphragm that is not covered with the mirror.

The combs' teeth of one or several line modulators in the line element can be covered with the continuous thin dielectric mirror reflecting light of the corresponding wavelength, and one or all hypotenuse sides of prisms that do not contain line modulators (free sides) are covered with a mirror.

The last free leg lateral side of the prism of the line modulator can be covered with the mirror.

In another embodiment of the invention the electrooptical converter comprises red, green and blue optical lighters, the transparent support in the form of at least one plane-parallel plate or at least one prism of total internal reflection, one line modulator, at least one visualizer, the perception device, three control devices corresponding to red, green and blue optical lighters, the control devices connected electrically by the outputs with the color commutator connected by one output to the line modulator, and by three outputs—to three optical lighters sequentially switched on by it, and by the fifth output—to the means of scanning, while the line modulator comprises the transparent electroconducting layer applied to the transparent support, the electroconducting layer being covered with the transparent gel-like layer, and the system of i parallel ribbon control electrodes and ground electrodes, arranged on the second support in one plane and located with the gap above the transparent gel-like layer, wherein the line modulator together with the transparent support forms the line element and each optical lighter consists of the lengthy light source and the lighting convertible lens sequentially located on the optical axis, the light source is pulse or continuous, and the frequency of light pulse recurrence is equal to the line frequency of the image; the visualizer includes the Fourier-objective and the visualizing diaphragm sequentially located on the optical axis, while the collinear flux of radiation of all three colors falls perpendicularly and sequentially in time onto the line element, and the ribbon control electrodes are electrically connected to the periodic structure of the control teeth, and the ground electrodes are electrically connected to the periodic structure of the ground teeth, while for each line pixel the teeth together with the electrodes look like two conducting combs isolated from each other, while the combs' teeth are located in parallel to the lengthy light sources, and the period of order for the pairs of control teeth and ground teeth $\lambda_{teeth}$ is determined according to the relation: $\lambda_{teeth} \leq \sqrt{2} \lambda_{light\ min}/\alpha_{div\ max}$, where $\alpha_{div\ max}$ is the greatest divergence of radiation among red, green and blue colors and $\lambda_{light\ min}$ is the minimum length of the light wave, while the size of opaque visualizing diaphragm is determined according to the condition of overlapping of zero orders of all three colors, and the voltage on the control electrodes of the line modulator forms the necessary depth of the relief for each color, and the gel-like layer is made on the base of polyvinylsiloxane $(CH_2=CH)_3SiO[(CH_3)_2SiO]_mSi(CH=CH_2)_3$ with molecular mass of 10000-16000 and viscosity of 800-1000 centistokes, oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes.

In another embodiment of the invention the electrooptical converter comprises at least one optical lighter, one transparent support or M transparent supports, each in the form of at least one plane-parallel plate, at least one line modulator, at least one visualizer, the perception device, and further comprises at least one control device, wherein each line modulator comprises the transparent electroconducting layer applied to the corresponding transparent support, the electroconducting layer being covered with the transparent gel-like layer, and the system of i parallel ribbon control electrodes and ground electrodes, arranged in one plane on the second support corresponding to each line modulator and located with the gap above the transparent gel-like layer and electrically connected with the control device, wherein each transparent support together with corresponding at least one modulator forms the line element, while the optical lighter consists of the lengthy light source and the lighting convertible lens sequentially located on the optical axis, and the visualizer includes the Fourier-objective and the visualizing diaphragm sequentially located on the optical axis; the light source is pulse or continuous, and the frequency of light pulse recurrence is equal to the line frequency of the image; the optical lighter is arranged in such a way that radiation from it is directed to the plane-parallel plate, to the transparent electroconducting layer, to the transparent gel-like layer, to the air gap at an angle less than 90 degrees, while the ribbon control electrodes are electrically connected to the periodic structure of the control teeth, and the ground electrodes are electrically connected to the periodic structure of the ground teeth, for each line pixel the teeth together with the electrodes look like two conducting combs isolated from each other, while the combs' teeth are located in parallel to the lengthy light source and are covered with a continuous thin dielectric mirror reflecting light of the corresponding wavelength, and the period of order for the pairs of control teeth and ground teeth $\lambda_{teeth}$ is determined according to the relation: $\lambda_{teeth} \leq \sqrt{2} \lambda_{light\ min}/\alpha_{div\ max}$, wherein $\lambda_{light}$ is a wavelength of the lengthy light source and $\alpha_{div}$ (in radians) is a divergence of the radiation of the light source in a direction perpendicular to the combs' teeth, and the gel-like layer is made on the base of polyvinylsiloxane $(CH_2=CH)_3SiO[(CH_3)_2SiO]_mSi(CH=CH_2)_3$ with molecular mass of 10000-16000 and viscosity of 800-1000 centistokes, oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes.

The objects of the invention can be also achieved by a gel-like layer for the electrooptical converter.

The gel-like layer for the electrooptical converter is a product of the reaction of the components of the gel-like composition which includes polyvinylsiloxane $(CH_2=CH)_3SiO[(CH_3)_2SiO]_mSi(CH=CH_2)_3$ with the molecular mass of 10000-16000 and viscosity of 800-1000 centistokes, oligohydridesiloxane $(CH_3)_3SiO\{[(CH_3)_2SiO][CH_3SiO(H)]\}Si(CH_3)_3$ as a cross-linking agent, with hydride groups content of 10-15% and viscosity of 50-100 centistokes, polymethylsiloxane fluid $(CH_3)_3SiO[(CH_3)_2SiO]Si(CH_3)_3$ as a plasticizer with viscosity of 5-20 centistokes, 0.1% solution of chloroplatinic acid in an organic solvent or its complex with tetravinylsilane as a catalyst of hardening, in the following proportion (mass parts): polyvinylsiloxane—100, oligohydridesiloxane—15-25, polymethylsiloxane fluid—150-300, 0.1% solution of chloroplatinic acid in the organic solvent or its complex with tetravinylsilane—0.3-2.

The objects of invention can be also achieved by a method of preparation of the gel-like layer for the electrooptical converter.

The method of preparation of the gel-like layer for the electrooptical converter according to the present invention comprises mixing of 100 mass parts of polyvinylsiloxane $(CH_2=CH)_3SiO[(CH_3)_2SiO]_mSi(CH=CH_2)_3$ with a molecular mass of 10000-16000 and viscosity of 800-1000 centistokes with 15-25 mass parts of oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes and adding 150-300 mass parts of polymethylsiloxane fluid $(CH_3)_3SiO[(CH_3)_2SiO]Si(CH_3)_3$ with viscosity of 5-20 centistokes after the end of mixing, then after the repeated mixing 0.3-2 mass parts of 0.1% solution of chloroplatinic acid in an organic solvent or its complex with tetravinylsilane is added, the resulting composition is mixed and applied to the electroconducting transparent layer as a layer of a uniform thickness after the end of mixing.

In the preferred embodiment of the invention the composition is applied to the electroconducting transparent layer on the expiry of 1-20 min after the end of mixing.

The resulting composition is applied to the electroconducting transparent layer as a layer of a uniform thickness after the end of mixing in the following way: by forming, cross-linking and cooling of the first layer, then by applying of one or more of additional gel layers on the first or the previous cross-linked and cooled gel layer.

In another embodiment of the invention the method of preparation of the gel-like layer for the electrooptical converter comprises mixing of 100 mass parts of polyvinylsiloxane $(CH_2=CH)_3SiO[(CH_3)_2SiO]_m Si(CH=CH_2)_3$ with molecular mass of 10000-16000 and viscosity of 800-1000 centistokes with 15-25 mass parts of oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes, adding of 150-300 mass parts of polymethylsiloxane fluid $(CH_3)_3SiO[(CH_3)_2SiO]Si(CH_3)_3$ with viscosity of 5-20 centistokes after the end of mixing, adding after the repeated mixing 0.3-2 mass parts of 0.1% solution of chloroplatinic acid in an organic solvent or its complex with tetravinylsilane, then the resulting composition is mixed and applied to the electroconducting transparent layer as a layer of a uniform thickness after the end of mixing, after that the obtained layer is covered with an additional plate with an optical flat surface, and the thickness of the gel-like layer is flattened by the main spacers, arranged between the transparent electroconducting layer and the additional plate, then the obtained construction is placed into the oven and kept at the temperature of 70-90° C. for about 2-4 hours, then the additional plate is separated, and the gel-like layer is covered with the second support with the control electrodes and the ground electrodes applied to it, the electrodes being covered with thin protective dielectric layer, while the gap is assigned by the additional spacers, which are bigger than the main ones.

The resulting composition can be applied to the electroconducting transparent layer as a layer of a uniform thickness after the end of mixing in the following way: by forming, cross-linking and cooling of the first layer, then by applying of one or more of additional gel layers on the first or the previous cross-linked and cooled gel layer.

The additional plate is preferably covered with an antiadhesive layer, a surface-active substance, such as sulfanol-π, may be used as the antiadhesive layer.

The additional plate is preferably treated with plasma or another clearing irradiation.

In another embodiment of the invention the method of preparation of the gel-like layer for the electrooptical converter comprises mixing of 100 mass parts of polyvinylsiloxane $(CH_2=CH)_3SiO[(CH_3)_2SiO]_m Si(CH=CH_2)_3$ with molecular mass of 10000-16000 and viscosity of 800-1000 centistokes with 15-25 mass parts of oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes, adding of 150-300 mass parts of polymethylsiloxane fluid $(CH_3)_3SiO[(CH_3)_2SiO]Si(CH_3)_3$ with viscosity of 5-20 centistokes after the end of mixing, adding after the repeated mixing 0.3-2 mass parts of 0.1% solution of chloroplatinic acid in an organic solvent or its complex with tetravinylsilane, then the resulting composition is mixed and applied to the electroconducting transparent layer as a layer of a uniform thickness after the end of mixing, after that the obtained layer is covered with an additional plate with an optical flat surface, and the thickness of the transparent gel-like layer is flattened by the main spacers, arranged between the transparent electroconducting layer and the additional plate, then the obtained construction is placed into the oven and kept at the temperature of 70-90° C. for about 1-2 hours, then it is cooled down to ambient temperature, after that the additional plate is separated, then the gel-like layer located on the transparent electroconducting layer is again placed into the oven and held at the temperature of 70-90° C. up to complete cross-linking of the gel for about 1-3 hours.

The resulting composition can be applied to the electroconducting transparent layer as a layer of a uniform thickness after the end of mixing in the following way: by forming, cross-linking and cooling of the first layer, then by applying of one or some of additional gel layers on the first or the previous cross-linked and cooled gel layer.

The additional plate can be covered with an antiadhesive layer.

A surface-active substance, such as sulfanol-π, can be used as the antiadhesive layer.

The additional plate can be treated with plasma or another clearing irradiation.

In yet another embodiment of the invention the method of preparation of the gel-like layer for the electrooptical converter comprises mixing of 100 mass parts of polyvinylsiloxane $(CH_2=CH)_3SiO[(CH_3)_2SiO]_m Si(CH=CH_2)_3$ with molecular mass of 10000-16000 and viscosity of 800-1000 centistokes with 15-25 mass parts of oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes, adding of 150-300 mass parts of polymethylsiloxane fluid $(CH_3)_3SiO[(CH_3)_2SiO]Si(CH_3)_3$ with viscosity of 5-20 centistokes after the end of mixing, adding after the repeated mixing 0.3-2 mass parts of 0.1% solution of chloroplatinic acid in an organic solvent or its complex with tetravinylsilane, then the resulting composition is mixed and applied to the electroconducting transparent layer as a layer of a uniform thickness after the end of mixing, after that the obtained layer is covered with an additional plate with an optical flat surface, and the thickness of the transparent gel-like layer is flattened by the main spacers, arranged between the transparent electroconducting layer and the additional plate, then the obtained construction is placed into the oven and kept at the temperature of 70-90° C. for about 2-4 hours, then the additional plate is separated, and the gel-like layer is covered with the second support with the control electrodes and the ground electrodes applied to it, the electrodes being covered with the thin protective dielectric layer, while the gap is assigned by the main spacers after complete cross-linking, contraction and cooling of the gel down to ambient temperature.

In this embodiment the resulting composition can be applied to the electroconducting transparent layer as a layer of a uniform thickness after the end of mixing in the following way: by forming, cross-linking and cooling of the first layer, then by applying of one or some of additional gel layers on the first or the previous cross-linked and cooled gel layer.

The additional plate is preferably covered with an antiadhesive layer.

In the preferred embodiment a surface-active substance, such as sulfanol-π, is used as the antiadhesive layer.

The additional plate can be treated with plasma or another clearing irradiation.

In another embodiment of the invention the method of preparation of the gel-like layer for the electrooptical converter comprises mixing of 100 mass parts of polyvinylsiloxane $(CH_2=CH)_3SiO[(CH_3)_2SiO]_m Si(CH=CH_2)_3$ with molecular mass of 10000-16000 and viscosity of 800-1000 centistokes with 15-25 mass parts of oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes, adding of 150-300 mass parts of polymethylsiloxane fluid $(CH_3)_3SiO[(CH_3)_2SiO]Si(CH_3)_3$ with viscosity of 5-20 centistokes after the end of mixing, adding after the repeated mixing 0.3-2 mass parts of 0.1% solution of chloroplatinic acid in an organic solvent or its complex with tetravinylsilane, then the resulting composition is mixed and applied to the electroconducting transparent layer as a layer of a uniform thickness after the end of mixing, after that the obtained layer is covered with an additional plate with an optical flat surface, and the thickness of the gel-like layer is flattened by the main spacers, arranged between the transparent electroconducting layer and the additional plate, then the obtained construction is placed into the oven and kept at the temperature of 70-90° C. for about 1-2 hours, then it is cooled down to ambient temperature, after that the additional plate is separated, then the gel-like layer located on the transparent electroconducting layer is again placed into the oven and kept at the temperature of 70-90° C. up to complete cross-linking of the gel for about 1-3 hours, while the gap is assigned by the main spacers after complete cross-linking, contraction and cooling of the gel down to ambient temperature.

The resulting composition can be applied to the electroconducting transparent layer as a layer of a uniform thickness after the end of mixing in the following way: by forming, cross-linking and cooling of the first layer, then by applying of one or some of additional gel layers on the first or the previous cross-linked and cooled gel layer.

The additional plate is preferably covered with an antiadhesive layer.

In the preferred embodiment a surface-active substance, such as sulfanol-π, is used as the antiadhesive layer.

The additional plate can be treated with plasma or another clearing irradiation.

The tasks of the present invention can be also solved by the composition for the realization of the method of preparation of the gel-like layer.

The composition of the present invention for the realization of the method of preparation of the gel-like layer for the electrooptical converters includes polyvinylsiloxane $(CH_2=CH)_3SiO[(CH_3)_2SiO]_mSi(CH=CH_2)_3$ with molecular mass of 10000-16000 and viscosity of 800-1000 centistokes, oligohydridesiloxane $(CH_3)_3SiO\{[(CH_3)_2SiO][CH_3SiO(H)]\}Si(CH_3)_3$ as a cross-linking agent with hydride groups content of 10-15% and viscosity of 50-100 centistokes, polymethylsiloxane fluid $(CH_3)_3SiO[(CH_3)_2SiO]Si(CH_3)_3$ as a plasticizer with viscosity of 5-20 centistokes, 0.1% solution of chloroplatinic acid in an organic solvent or its complex with tetravinylsilane as a catalyst of hardening with the following ratio of the mixture components (mass parts): polyvinylsiloxane—100, oligohydridesiloxane—15-25, polymethylsiloxane fluid—150-300, 0.1% solution of chloroplatinic acid in the organic solvent or its complex with tetravinylsilane—0.3-2.

BRIEF DESCRIPTION OF THE DRAWINGS

FIG. 6a shows the optical schema with the modulator having a dielectric mirror. FIG. 6b shows the optical schema containing one prism, FIGS. 6c and 6d—two prisms, FIG. 6e—four prisms. FIG. 6f shows an example of performance of the optical schema with a mirror applied to the last free leg side of the prism of the line modulator.

FIG. 7a shows the line element which has free leg sides in one plane. FIGS. 7b and 7c show that the first and the last free leg sides are mutually perpendicular, and each line element has three line modulators located on hypotenuse sides.

FIGS. 8a and 8b show schemata of sequential color combination with the help of one and three line modulators correspondingly. FIG. 8c shows the known optical schema of color combination on the screen using dichroic mirrors. FIG. 8d shows one of the embodiments of the present invention with parallel color combination without usage of dichroic mirrors.

DETAILED DESCRIPTION OF THE INVENTION

Figure 1:
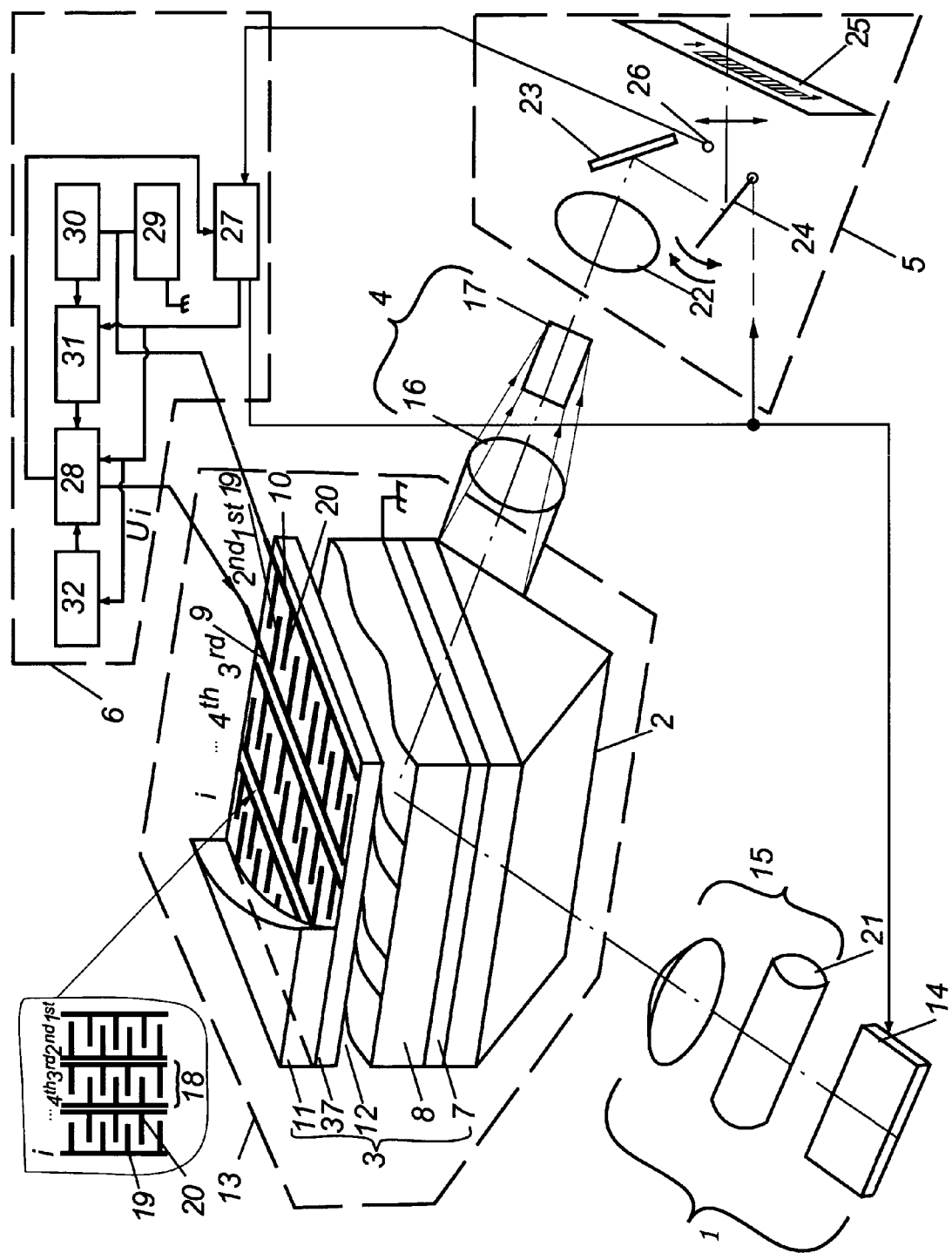
FIG. 1. shows a detailed schema of one channel of the electrooptical converter.

The electrooptical converter (FIG. 1-15) contains sequentially located on the optical axis: at least one optical lighter 1, a transparent support 2 in the form of at least one plane-parallel plate or a prism of total internal reflection, at least one line modulator 3, at least one visualizer 4, a perception device 5, and further comprises at least one control device 6, wherein the line modulator 3 comprises a transparent electroconducting layer 7 applied to the transparent support 2, the electroconducting layer 7 being covered with a transparent gel-like layer 8, and a system of i parallel ribbon control electrodes 9 and ground electrodes 10, applied to a second support 11 and located with a gap 12 above the transparent gel-like layer 8 and electrically connected with the control device 6, wherein at least one line modulator 3 together with the transparent support 2 forms a line element 13; while the optical lighter 1 consists of a lengthy light source 14 and a lighting convertible lens 15 sequentially located on the optical axis, and the visualizer 4 includes a Fourier-objective 16 and a visualizing diaphragm 17 sequentially located on the optical axis; the light source 14 is pulse or continuous, and the frequency of light pulse recurrence is equal to the line frequency of the image; while the ribbon electrodes 9 and 10 are located in parallel on the second support 11 in one plane and are connected to a block of sources of voltage signals, wherein for each line pixel 18 the ribbon control electrodes 9 are electrically connected to the periodic structure of the control teeth 19, and the ground electrodes 10 are electrically connected to the periodic structure of the ground teeth 20. The teeth 19 and 20 together with the electrodes 9 and 10 look like two conducting combs isolated from each other, while the combs' teeth 19 and 20 are located in parallel to the lengthy light source 14, while the location period of the pairs of the control teeth 19 and ground teeth 20 $\lambda_{teeth}$ for each wavelength of the lengthy light source 14 $\lambda_{light}$ and its divergence $\alpha_{div}$ (in radians) in a direction perpendicular to the combs' teeth is calculated from the relation: $\lambda_{teeth} \leq \sqrt{2} \lambda_{light}/\alpha_{div}$.

Recently, lengthy light sources have been developed, e.g., semiconductor lasers, in particular, in all visible region of light, which have a luminescence body of 1 micron, and their power reaches tens of watt. Due to the "poor" divergence of light along the luminescence body and due to "point species focus" of the longitudinal luminescence body, it is possible to generate by a lighting objective a light flux with the very small angle of divergence in a plane, perpendicular to lengthy source. Moreover, it is possible to obtain a very narrow beam of a lighted area. A usage of the ribbon electrodes oriented perpendicularly to a lengthy light source in analogs results in a great light loss. Moreover, such orientation of the electrodes requires dimensional frequency one and a half time greater. If the linear pixels, i.e. ribbon electrodes are arranged on hypotenuse side of the prism in parallel to a lengthy light source, it will result in distortion of the information because of the expansion of one side of the line of signals and compression of another one. These distortions will increase with the increase of the number of pixels in a line. An application of the comb electrodes increases a record sensitivity and allows to reduce the breadth of a light platform parallel to the lengthy light source and also to reduce nonlinear distortions of a screen image. For example, to obtain a breadth of the light platform of 25-125 microns it is enough to use from two to ten combs' teeth at 80 lines/mm in a pixel comb structure correspondingly.

In another embodiment (FIG. 1) at least one cylindrical objective 21 which generatrix is parallel to the combs' teeth 19, 20 is inserted into the lighting convertible lens 15.

In another embodiment (FIG. 1) the visualizer 4 contains at least one cylindrical objective which generatrix is parallel to the combs' teeth.

In another embodiment (FIG. 1) the perception device 5 contains a projection lens 22, a system of mirrors 23, a means 24 for vertical scanning of a line, a screen 25, a photosensor 26 of a scanner, while the axis of the scanning means is perpendicular to the ribbon electrodes, the toroidal-cylindrical objective is inserted into the projection lens, wherein the cylindrical objective has the generatrix parallel to the combs' teeth.

In yet another embodiment (FIG. 1) the control device consists of the synchronization device 27 which output is connected to the block of sources of voltage signals 28, and its input is connected to the photosensor 26 of the scanner, the base voltage source 29 located between the transparent electroconducting layer 7 and the ground electrodes 10, the block of sources of voltage signals 28 connected to i inputs of the control electrodes 9 of the line modulator 3, a bias voltage source 30 connected via electric source of corrections of the time front of relief formation 31 by one output to the like outputs of the block of sources of voltage signals, and by the other output—to the ground electrodes 10, while the synchronization device 27 has two additional outputs, one of which is connected to the light source 14, and the other—to the means of scanning of the line 24, and also has an additional input from the block of sources of voltage signals 28, while the electric source of corrections of the time front of relief formation 31 is inserted sequentially with the bias voltage source 30 and connected to the synchronization device 27 which at the moment of powering up the pulse signal applies an additional pulsing bias voltage of the time determined form, and a commutator 32 switching polarity of a signal on the control and ground electrodes according to the given time-space rule is connected to the block of sources of voltage signals 28 and to the synchronization device 27. The electric source 31 of corrections of the time front of the relief formation allows increasing of the operating speed of the device in the case of connecting of an additional electric pulse for the period of front operation. The term "according to the given time-space rule" means that it can be necessary either to change voltage from one electrode to another or to change the voltage on one electrode depending on concrete application of the invention.

Moreover, as it is known from the prior art, the transparent support is a single prism with a foundation in a form of a rectangular triangle. It restricts design and operation capabilities of the device as well as the possibility of expansion of functions of the relief record control.

Therefore, in one of the embodiments of the invention (FIGS. 4-7) the transparent support is made in the form of N triangular prisms 33 with a rectangular triangle as the basis sequentially optically conjugated by the equal leg lateral sides, while the line modulators 3 are applied to all or on some of hypotenuse lateral sides, while one leg lateral side of the first prism has a free surface directed to at least one optical lighter 1, and one leg lateral side of the last prism has a free surface directed to at least one visualizer 4, while these sides are located perpendicularly to the optical axis, and the light from the optical lighter 1 falls on all hypotenuse sides at the angle bigger than the angle of total internal reflection, and the line modulators 3 have equal or different spatial frequencies of the combs' teeth.

Such construction of the transparent support allows to adjust the optical converter to engineering solutions similar to the straight-flow optical schemata being at the same time about three times more sensitive to an electric signal than the rear-projection electrooptical converters.

In yet another embodiment of the invention (FIG. 2) the system of the parallel ribbon control 9 and ground electrodes 10 is applied to the second support 11 and is covered with a thin dielectric layer 34 of a uniform thickness to which the combs' control teeth 19 and ground teeth 20 parallel to the lengthy light source 14 are applied perpendicularly to the ribbon control 9 and ground 10 electrodes, and the control teeth 19 are electrically connected by the contacts 35 with the ribbon control electrode 9, and the ground teeth 20 are electrically connected by the contacts 36 with the ribbon control electrode 10, wherein the butt-ends of the teeth of one pixel 18 are located opposite to butt-ends of the teeth of a neighbor pixel with a gap, the teeth are covered with a thin protective dielectric layer 37 with adjustable electric properties, e.g. electrical conductance or dielectric permeability.

The term "a thin layer" is common in the field of engineering to which the present invention refers, and means that a thickness of the layer is much more smaller then its length or breadth.

Such variant of comb electrode construction essentially increases the functional area of the relief record, therefore increasing a light output of the optical converter. The interchange of the ground and control combs between the neighbor pixels reduces the mutual effect of the pixels and also increases the functional area. The protective dielectric layer with adjustable electric properties allows increasing of the voltage of the base voltage source 29 with simultaneous decrease of a signal voltage due to reduction of the electric field nonuniformity in the gap 12 in the absence of the signal voltage.

In another embodiment of the invention (FIG. 3), the system of parallel ribbon control electrodes 9 and ground electrodes 10 is applied to the second support and is covered with the thin dielectric layer 34 of a uniform thickness on which the combs' ground teeth 20 connected electrically by the contacts 36 to the ribbon ground electrode 10 and covered with the second thin dielectric layer 38 of the uniform thickness are located. On the second dielectric layer 38 the combs' control teeth 19 connected electrically by the contact 35 to the ribbon control electrode 9 are located, while in each pixel 18 the butt-ends of the teeth are located opposite to the intervals between the butt-ends of the teeth of the neighbor pixel.

An addition of the second dielectric layer 38 increases the spatial resolution of the line modulator 3. The maximum resolution i.e. the maximal number of the control electrodes per length unit is determined in the prototype by the minimally possible values of the breadth of control and ground electrodes and the distances between them. These values are restricted by technological possibilities and are approximately equal to each other (in the prototype, upon the decrease of the distance between the electrodes lower than a certain value, edges of electrodes "stick together" on some sections, which means a state of nonoperability of the device). The addition of the second dielectric layer 38 allows reducing of the minimum distance between the combs' teeth approximately in two-three times. When the width of the second dielectric layer 38 is much less (five-ten fold and more) than the breadth of an electrode, the sensitivity of record remains unaffected. The increase of the maximum resolution by the above-disclosed method improves the image quality on the perception device 5.

In the prior art, including the prototype, there are no known constructions allowing creating the direct view displays with a very small power consumption. Usage of a single prism or an odd number of optically conjugated prisms does not allow creating displays of such kind. The task is solved in the following embodiment of the invention (FIG. 4) where there are M line elements 13, the transparent support of each of the line elements consisting of an even number of prisms 33 located in one plane as a linear matrix, wherein, the first and the last free leg lateral sides of the line elements located in parallel planes or in one plane are directed to the matrixes of M monochrome, three-colored or multi-colored optical lighters 1 and of M monochrome, three-colored or multi-colored visualizers 4 correspondingly. In this embodiment, which represents a color display of direct view, the power of all three light sources operating simultaneously is used completely. If the perception device contains the projection lens with an aperture grater than the square of the linear matrix, and the screen sequentially located on the optical axis which allows to obtain a color tele-projector with the single visualizer for all three colors, the matrix line element constructively looks like a transmissive modulator, but its sensitivity is approximately three times higher.

In yet another embodiment (does not shown on the drawings) the perception device is made in the form of a transparent or mat, or photosensitive, or thermo-sensitive material and is located after the matrix of visualizers on the optical axis. The invention besides to the development of the displays of direct view in the case of usage of transparent or mat material can be applied for the information record on photosensitive or thermosensitive carriers. Means of scanning are not required for this construction. If the perception device contains the projection lens with the aperture greater than the square of the linear matrix, and the screen sequentially located on the optical axis, this embodiment can be upgraded into a projector.

According to yet another embodiment (FIG. 8a) the device contains sequentially located on the optical axis: red (R), green (G) and blue (B) optical lighters 1, the transparent support 2 in the form of at least one plane-parallel plate or a prism of total internal reflection, one line modulator 3, at least one visualizer 4, the perception device 5, three control devices 6 connected electrically by the outputs with the color commutator 39 connected by one output to the line modulator 3, and by three outputs—to three optical lighters 1 sequentially switched on by it, and by the fifth output—to the means of scanning 24, while the line modulator 3 comprises the transparent electroconducting layer 7 applied to the transparent support 2, the electroconducting layer 7 being covered with the transparent gel-like layer 8, and the system of i parallel ribbon control electrodes 9 and ground electrodes 10, applied to the second support 11 and located with the gap 12 above the transparent gel-like layer 8 and electrically connected with the control device 6, wherein at least one line modulator 3 together with the transparent support 2 forms the line element 13; while the optical lighter 1 consists of the lengthy light source 14 and the lighting convertible lens 15 sequentially located on the optical axis, and the visualizer 4 includes the Fourier-objective 16 and the visualizing diaphragm 17 sequentially located on the optical axis; the light source 14 is pulse or continuous, and the frequency of light pulse recurrence is equal to the line frequency of the image; wherein on the optical axis are sequentially located: the red (R) optical lighter, the first dichroic mirror 23 transmitting red light and reflecting green light and arranged at 45 degrees to the optical axis and to the green optical lighter (G), the second dichroic mirror 23 transmitting red light and green light and reflecting blue light and arranged at 45 degrees to the optical axis and to the blue optical lighter (B), while a collinear flux of radiation of all three colors falls perpendicularly and sequentially in time onto the line element 13, while the ribbon electrodes 9 and 10 are located on the second support 11 in one plane and connected to the block of sources of voltage signals 28, wherein for each line pixel 18 the ribbon control electrodes 9 are electrically connected to the periodic structure of the control teeth 19, and the ground electrodes 10 are electrically connected to the periodic structure of the ground teeth 20, while the teeth 19 and 20 together with the electrodes 9 and 10 look like two conducting combs isolated from each other, while the combs' teeth 19 and 20 are located in parallel to the lengthy light source 14, and the line modulator 3 has the period of order for the pairs of control teeth and ground teeth $\lambda_{teeth}$ determined for the minimum length of the light wave according to the relation: $\lambda_{teeth} \leq \sqrt{2}\, \lambda_{light\ min}/\alpha_{div\ max}$, where $\alpha_{div\ max}$ is the greatest divergence of radiation among red, green and blue colors. The size of opaque visualizing diaphragm 17 is determined according to the condition of overlapping of zero orders of all three colors, and the voltage on the control electrodes 9 of the line modulator 3 forms the necessary depth of the relief for each color.

This allows to obtain a compact color electrooptical converter with the sequential color combination, and also essentially reduces the cost and dimensions of the converter.

In yet another embodiment of the invention (FIG. 8b) three line modulators 3 sequentially process three colors. This embodiment allows to use the modulator almost of the same type for all three colors, due to the fact that these modulators are located on the optical axis on different distances from the Fourier-objective 16. The modulator is constructed in such a manner that each line element 13 contains three line modulators 3 with three various spatial periods of order of pairs of control teeth 19 and ground teeth 20 $\lambda_R, \lambda_G, \lambda_B$ corresponding to the red, the green and the blue optical lighters, connected electrically with the color commutator 39. The three line modulators 3 switched on sequentially in time are located on the optical axis in such a way that the line modulators 3 with the greater wavelength are located on a greater distance from the Fourier-objective 16. FIG. 8c shows the known optical scheme of the combination of color on the screen using dichroic mirrors.

FIG. 8d shows yet another embodiment of the invention according to which the transparent support 2 is made in the form of at least one triangular prism 33 of total internal reflection, each line element 13 contains three line modulators 3 to be switched on simultaneously and applied as three color sections to one or several hypotenuse sides, wherein each modulator 3 has the corresponding period of order of the pairs of control teeth and ground teeth $\lambda_{teeth}$ for each color, three optical lighters 1 are arranged in parallel to each other, and the light flux of the corresponding color falls perpendicularly to the corresponding color section of the line modulator 3, while the light flux with the greater wavelength is directed to a section, located on a greater distance from the Fourier-objective 16, the opaque visualizing diaphragm 17 blocks or transmits radiation of the zero order of all three colors, and three control devices 6 are connected electrically to the means of scanning of the line 24, with red, green and blue optical lighters 1 and with corresponding color sections of the line modulator 3. Such construction allows usage of the power of the light sources completely, the possibility of usage of only one visualizer 4 and the projection lens 22 being remained. In the embodiment in which each section of the line modulators 3 corresponding to its own color is applied to separate hypotenuse sides of the transparent support consisting of three or more optically conjugated prisms 33, it is possible to use line modulators 3 with equal or similar dimensional frequencies. Unification of the line modulators for each color allows not only to decrease the cost of the device, but also to expand functionalities of control of modulators' relief because it is possible to use the optimal chemical composition of the record carrier and also to optimize geometrical, electric, mechanical and optical parameters of the line modulator.

In yet another embodiment (FIG. 6a) the device contains sequentially located on the optical axis: at least one optical lighter 1, the transparent support 2 in the form of at least one plane-parallel plate, at least one line modulator 3, at least one visualizer 4, the perception device 5, and further comprises at least one control device 6, wherein the line modulator 3 comprises the transparent electroconducting layer 7 applied to the transparent support 2, the electroconducting layer 7 being covered with the transparent gel-like layer 8, and the system of i parallel ribbon control electrodes 9 and ground electrodes 10, applied to the second support 11 and located with the gap 12 above the transparent gel-like layer 8 and electrically connected with the control device 6, wherein at least one line modulator 3 together with the transparent support 2 forms the line element 13; while the optical lighter 1 consists of the lengthy light source 14 and the lighting convertible lens 15 sequentially located on the optical axis, and the visualizer 4 includes the Fourier-objective 16 and the visualizing diaphragm 17 sequentially located on the optical axis; while the light source 14 is pulse or continuous, and the frequency of light pulse recurrence is equal to the line frequency of the image; the optical lighter is located in such a way that the radiation from the optical lighter is directed to the plane-parallel plate 41, to the transparent electroconducting layer 7, to the transparent gel-like layer 8, to the air gap 12 at an angle less than 90 degrees, while the ribbon electrodes 9 and 10 are located on the second support 11 in one plane and connected to the block of sources of voltage signals 28, wherein for each line pixel the ribbon control electrodes 9 are electrically connected to the periodic structure of the control teeth 19, and the ground electrodes 10 are electrically connected to the periodic structure of the ground teeth 20, while the teeth together with the electrodes look like two conducting combs isolated from each other, while the combs' teeth are located in parallel to the lengthy light source 14, the combs' teeth are covered with a continuous thin dielectric mirror 40 reflecting light of the corresponding wavelength in the line modulator 3, and the period of order of the pairs of control teeth and ground teeth $\lambda_{teeth}$, is determined from the relation: $\lambda_{teeth} \leq 2\, \lambda_{light}/\alpha_{div}$, for each wavelength of the lengthy light source $\lambda_{light}$ and its divergence $\alpha_{div}$ (in radians) in a direction perpendicular to the combs' teeth.

In this case the declination of the relief image to the optical axis is eliminated and the application of the means of scanning of the line 24 is not required. The use of the lengthy light source with very small luminescence body will allow creating effective projection optics with high efficiency.

Figure 10:
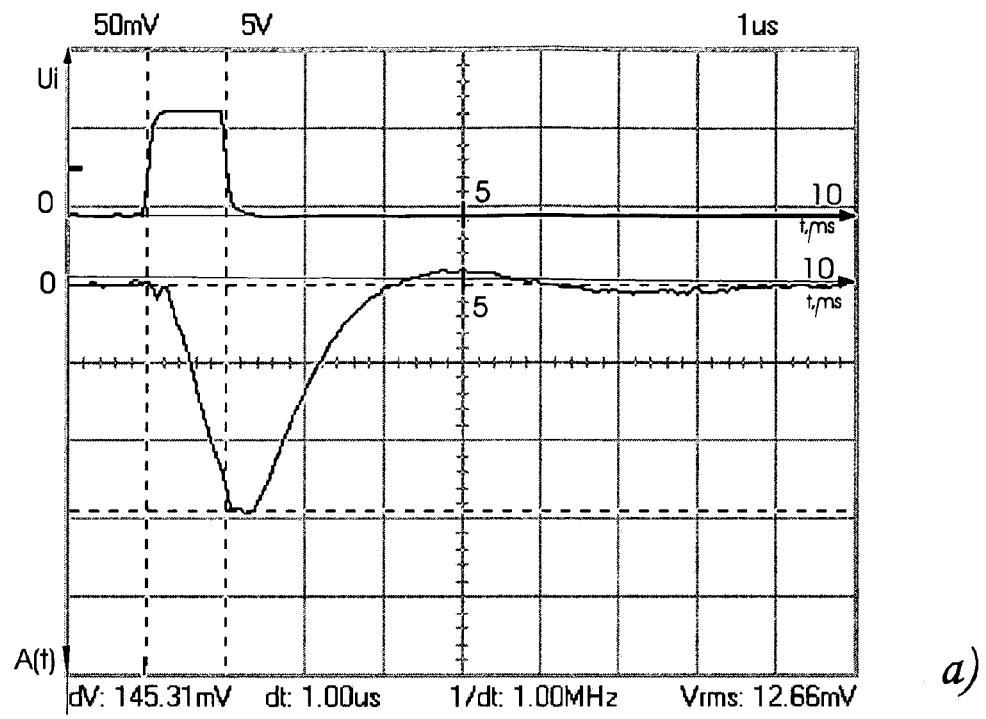
FIGS. 10a and 10b show two characteristic oscillograms of creation and erasing of the relief A(t) upon the action of the electric pulse $U_i$. Duration of the electric pulse is 1 μs (FIG. 10a) and 2 μs (FIG. 10b).
Figure 10:
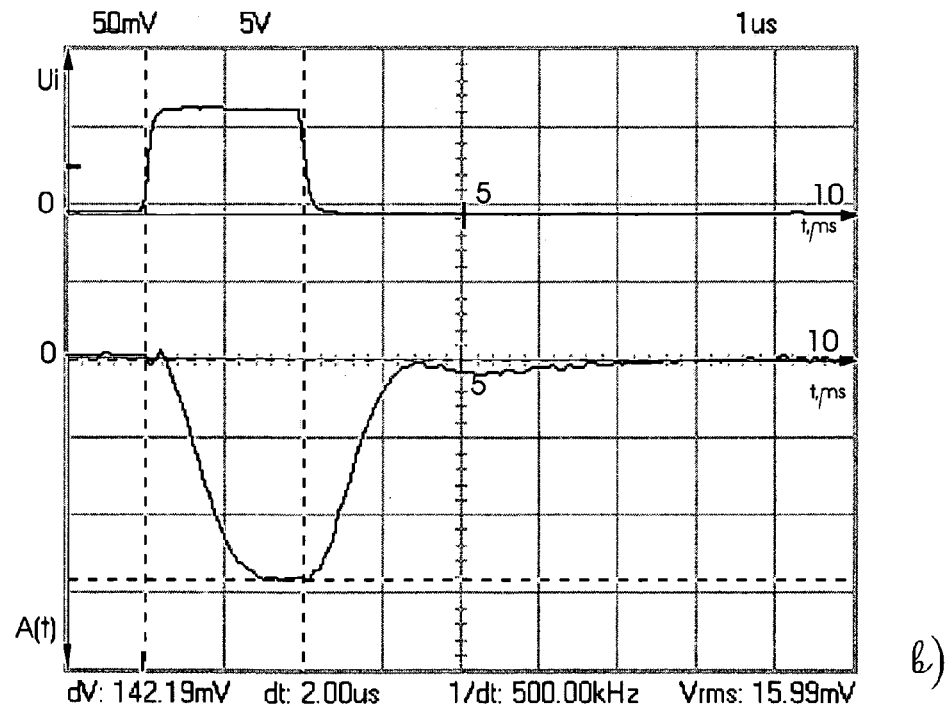

According to another embodiment (FIG. 9) the matrix fiber-optic switch with very high contrast is used. This contrast is provided by the usage of several line modulators 3 switched on sequentially on the way of light transmission, and a power portion of the zero order after passing through, for example, three gratings will be diminished by three orders, and after four gratings—by four orders. Other advantage of this embodiment of the invention is the possibility of implementation of the multiphase method for making-and-breaking the gratings. In this case static relief fluctuation as a result of a charge motion in the interelectrode space or in the gel-like deformable layer will be diminished up to the minimum due to dynamic mode of operating of the line modulator because the switching frequency of the modulator can reach 500 kH (FIG. 10). For the resolution of these problems, the lengthy light source 14 is designed in the form of an optical fiber 42 or a matrix of optical fibers, by one side connected to a monochrome or polychrome laser light source 43 of information and optically conjugated with a collimator 44 by the other side. The collimator 44 is optically conjugated with the prism 33 which is met first on the way of the light transmission, while each optical fiber 42 is optically conjugated to one or several pixels 18 of the line modulator 3, and the prism 33 last met on the way of light transmission is conjugated to one visualizer or a matrix of visualizers 4, wherein the opaque visualizing diaphragm 17 contains one hole or a matrix of holes 45 with an aperture transmitting the zero order of light diffraction controlled by electrodes of pixels 18, while the objective 46 is located on the optical axis after that hole on a distance less than the focal one, and the objective focuses light on the output optical fiber 47 connected on the other side to the registration device 48 of the light information, and the signal voltage is applied to all line modulators 3 synchronously, or in a three-phase time mode, or in a multiphase time mode sufficient for creation of the optimum depth of the phase modulation equal to 4.82 radian, and the registration device 48 of the light information is electrically connected to the optical lighter 1. Each relief grating is controlled in such a way that the progression of light phase reaches 4.82 radian. It is known for a sinusoidal relief that under this condition, 100% of the light flux leaves the zero order in a phase plane of the Fourier-objective. A small residual light will be suppressed by repeated modulation on the gratings following next. Thus, in any case, the residual light can be adjusted to a necessary minimum value.

In one more embodiment of the invention the idea of creation of an optical filter is implemented. Since the highest diffraction orders for each wavelength of light are located in different points of space on the phase plane, the offered modification may be used either for a filtering of light or as an optical commutator with an operating speed up to 500 kH. In this embodiment (FIG. 9), in contrast to the previous one, the opaque visualizing diaphragm 17 contains the matrix of holes 45 transmitting radiation of plus-minus first and/or of other higher order of light diffraction, and the visualizer 4 for each line modulator 3 is designed in such a manner that the objective 46 is located against each hole, and the objective focuses light on the output optical fiber 47.

According to the next embodiment (FIG. 6d), it is possible to use a specially appointed or a natural (for example solar) outside light-striking as the optical lighter 1. It is achieved by the following construction. The optical lighter 1 is located at an angle less than 90 degrees and the perception device 5 is located at an angle of 90 degrees to the leg lateral side of the prism 33 of the line element 13 met first on the way of the light transmission, and the part of the visualizing diaphragm 17 blocking light of zero order of diffraction is covered with a mirror (not shown on the drawings) and located in parallel to the leg lateral sides of the prism 33 of the line element met last on the way of light transmission, while the second perception device 5 or a light-absorbing device 49 is located at the side of visualizing diaphragm 17 that is not covered with the mirror. Thus, in the case of absence of the relief, all light is reflected from the mirror diaphragm, and all pixels on the screen remain bright. Upon recording of the relief, light falls through the diaphragm hole and is absorbed by the light-absorbing device 49. In this case pixels 18 on the screen 25 become dark.

The combs' teeth 19, 20 of one or several line modulators 3 in the line element 13 are covered with the continuous thin dielectric mirror 40 reflecting light of the corresponding wavelength, and one or all hypotenuse sides of prisms that do not contain line modulators can be covered with a mirror. An application of the mirrors in the line modulators and on the free hypotenuse sides of the prisms forming the line element allows to use a light which falls on the prisms' sides at an angle smaller than the angle of the total internal reflection. In this case the contrast and efficiency of the line element increase.

Moreover, the last free leg lateral side of the prism 33 of the line modulator 3 can be covered with a mirror 50. An application of the mirror 50 covering the last leg side of the prism allows to double sensitivity and contrast of the line element 13 due to the fact that light passes through the relief of each line modulator 3 twice.

The proposed device has the following principle of operation. Electric signals in the form of, for example, rectangular voltage pulses $U_i$ (FIG. 1, i—the number of the control electrode) with an amplitude corresponding to the recorded information, are directed from the block of sources of voltage signals 28 to the control electrodes 9 and the ground electrodes 10. As a result, due to the difference in the dielectric permittivities of the transparent gel-like layer 8 and the air gap 12 ponderomotive forces arise at the gel-like layer—air gap interface. These forces cause a deformation of the free surface (i.e. relief) of the transparent gel-like layer 8 according to signals on the control electrodes 9 in the form of relief rasters parallel to the combs' teeth 19, 20. In contrast to the prototype where one pixel 18 is represented by only two ribbon electrodes 9 and 10, according to the present invention, each pixel is a grating with the great number of the combs' teeth 19 and 20. In other words, each pixel 18 in the line is the diffraction grating that essentially improves the quality of the record and reduces the mutual affect of the pixels. Besides, in comparison with the prototype, rotation of the comb of the pixel for 90 degrees increases the spatial frequency of the comb in 1.4 times upon reading by optical radiation.

Moreover, at such position of the comb of the pixel, it is proposed in this invention to move the diffraction grating of each neighbor pixel by the half of period additionally reducing the mutual affect of the neighbor pixels.

The recorded geometrical relief of the surface of the gel-like layer 8 in the form of diffraction grating parallel to the lengthy light source 14 is reproduced on the screen 25 as an image line as follows (FIG. 1). Each light source 14 together with the corresponding lighting convertible lens 15 illuminates the surface of the gel-like layer 8 of the corresponding intermediate carrier of the line relief record in the form of a narrow strip, which is perpendicular to the ribbon electrodes and parallel to the "hillocks" of the relief which are located along the combs' teeth 19 and 20 (see FIG. 1). Refraction coefficients of the prism of the total internal reflection (the support 2) and of the gel-like layer 8 are selected to be approximately equal to each other. Therefore, the light flux is reflected from the relief surface of the gel-like layer 8 at an angle of total internal reflection (about 45°) and is directed to the Fourier-objective 16 comprising at least one cylindrical objective. In the case of the absence of deformation of the free surface of the transparent gel-like layer 8, the Fourier-objective 16 focuses the whole light flux onto the opaque visualizing diaphragm 17, and in the presence of deformations the Fourier-objective 16 focuses the surface of the gel-like layer 8 is on the screen 25. The light line on the screen 25 will be modulated by its intensity according to the amplitude of the relief of the transparent gel-like layer 8. The cylindrical objective 21 being a part of the lighting convertible lens 15, and the Fourier-objective 16 form a light flux into a line on the plane of the screen 25. The lighting convertible lens 15 forms a narrow beam of light on the surface of the gel-like layer 8. The projection lens 22 can be provided before or after the scanner 24 and can be made, for example, in the form of toroidal-cylindrical projection lens, which additionally determines the width of the light line and allows scanning of the line within the aperture of the lens 22 with a minimum deterioration of the image quality. The scanner 24 or the drum realizing the vertical scanning of the line on the screen 25 is controlled by the synchronization device 27 and by the photosensor 26 controlling the position of the first line.

In another embodiment, at least one cylindrical objective 21 is inserted into a lighting convertible lens 15 and the generatrix of the cylindrical objective 21 is parallel to combs' teeth 19 and 20. Radiation from the lengthy light source 14 with the help of the cylindrical objective 21 is applied to the relief in the form of a narrow strip, the relief is provided upon the feeding of the signal voltage Ui to the combs' teeth 19 and 20. The periodic structure of the relief is also parallel to the combs' teeth, therefore the radiation diffracts on the relief perpendicularly to the combs' teeth. Exactly in this direction the divergence of the lengthy light source 14 is small and consequently the image quality is much higher than the one in the prototype.

Figure 11:
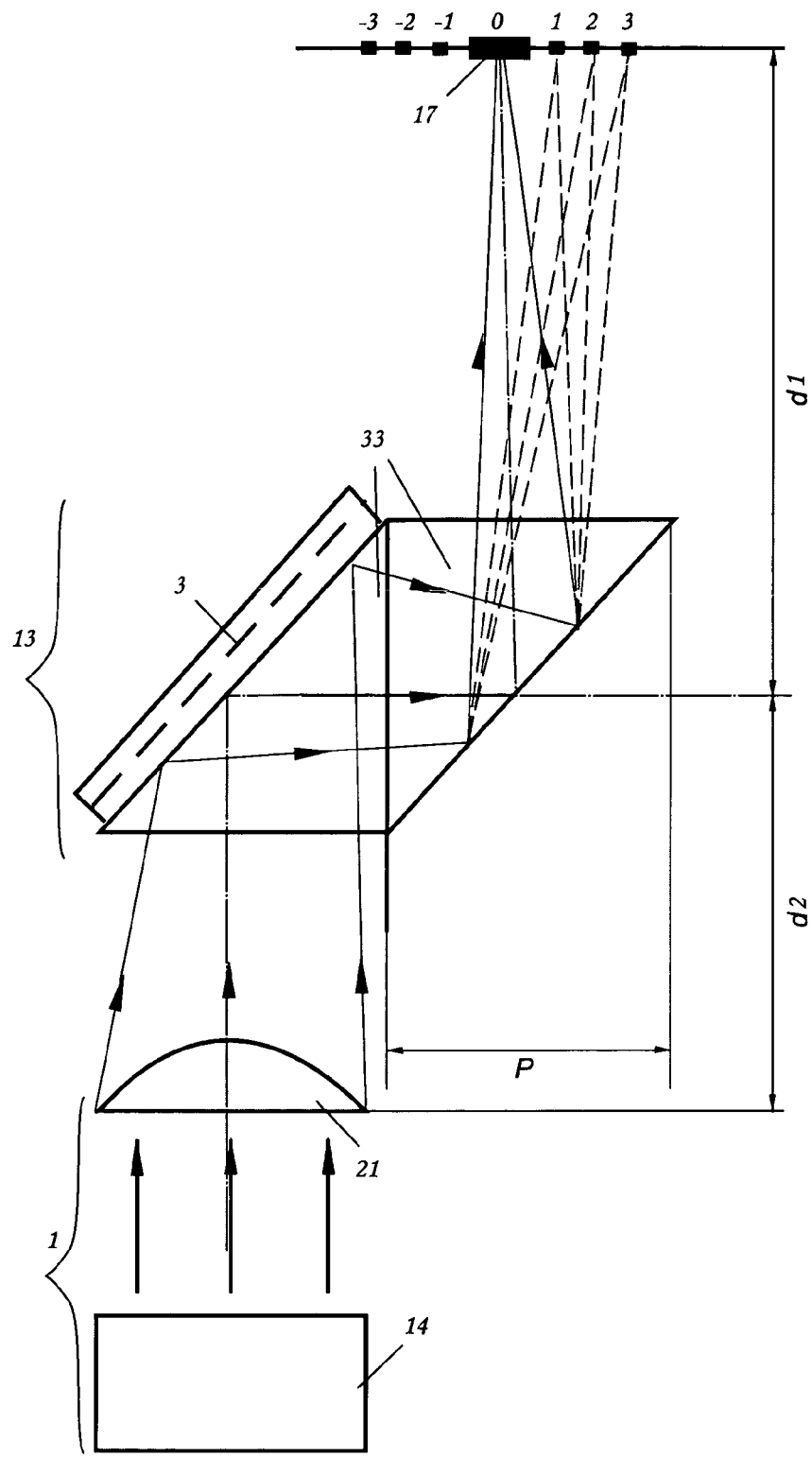
FIG. 11 shows an optical schema for calculation of a monochrome line element with two prisms.

In another embodiment, the visualizer 4 contains at least one cylindrical objective, which generatrix is parallel to the combs' teeth 19 and 20. Therefore, due to the cylindrical objective radiation from the lengthy light source diffracts on the relief and falls into a phase plane as a linear distribution in a space of zero, first, second etc. orders of diffraction. Visualization of a phase incursion of light into an amplitude brightness gradations on the screen occurs due to the overlapping of the zero order by the visualizing diaphragm (FIG. 11).

In another embodiment, the toroidal-cylindrical objective is inserted into the projection lens 22. The cylindrical objective has a generatrix parallel to the combs' teeth 19 and 20 and therefore additionally defines a width of the light line. Besides the toroidal-cylindrical objective allows to change a distance from the projector to the screen 25 without changing a focal distance of the Fourier-objective 16.

In another embodiment, the control device operates as follows. In the beginning of each frame and the image line, the timing signals come from the block of sources of voltage signals 28 to the synchronization device 27. Besides, impulses proceed from the photosensor 26 to the synchronization device 27 at the moments of change of sides of the mirror drum or another means of scanning 24. The synchronization device 27 compares a scanning frequency of the mirror with a frame frequency by these signals and applies a signal on the drive mechanism of the means of scanning 24 in such a way that the frequency of the mirror scanning is continuously slaved to a frequency of frames changing. After receiving the next signal from the photosensor 26 at the moment of changing of the sides of the mirror of the scanning means the synchronization device 27 sends a command to the block of sources of voltage signals 28. According to this command, all lines of the frame of the image are applied sequentially to the ribbon control electrodes 9 of the line modulator 3. At this time, the next image frame is memorized in the block of sources of voltage signals 28, and so on. Moreover, the control pulses are applied from the synchronization device 27 to the electrical response-time correction source 31 and to the commutator 32. The electrical response-time correction source 31 at the moment of switching-on a signal impulse gives additional pulse voltage of a given shape within a period of time which allows to reduce a time of the relief formation and thus to improve effectiveness of the device and image quality. The commutator 32 is intended for switching polarities of a signal on the control electrodes 9 and the ground electrodes 10 according to the given time-space law. It allows to reduce time of a relief deleting and thus to improve the image quality and to decrease the optical noises. Both the electrical response-time correction source, and the commutator 32 reduce time of a relief formation, i.e. allow to increase the clock frequency of the signals. Besides, the "running" or "standing" waves could be obtained which permit to stabilize process of a relief formation and deleting on a gel in dynamics. The system of mirrors 23 for monochrome or black-and-white variants of the projector is used as a nonprincipal constructional element. In case of a color image, two dichroic mirrors are included in the system of mirrors 23 for the combination of colors (FIG. 8a, 8b, 8c). One of the dichroic mirrors passes red and reflects green color, and the other one passes red and green and reflects blue color. The optical schemata, in which the usage of dichroic mirrors is not necessary, are known [3].

In another embodiment, several line modulators 3 improving a contrast of image are applied to the transparent support 2 consisting of several triangular prisms 33 (FIGS. 4-7). The light from the optical lighter 1 (see, for example, FIG. 6e) falls on the first line modulator 3, a signal voltage is applied to the combs' teeth 19 and 20 of the line modulator. Due to diffraction on the relief of the transparent gel-like layer 8, the main part of deflected light falls on the second line modulator 3 and after repeated diffraction, leaves the opaque visualization diaphragm 17 which blocks light of the zero order (FIG. 11f). The residual light of the zero order that passed through the first line modulator 3, diffracts on the second line modulator 3 and leaves the opaque visualization diaphragm 17. Thus the portion of the power of the zero order after passing through two modulators 3 will decrease as square, and after passing through three modulators 3 it will decrease proportionally to a cube as compared with the light power of the zero order passed through only one modulator. For example, if the light power of the zero order, that passed through one modulator, is equal to 5%, the light power, that passed through two modulators, will be equal to 0.25%, and after three modulators—0.0125%. Thus, the contrast on the screen can be increased up to a level assigned by the specification of the requirement.

In addition to improving the contrast and the growth of reliability, this embodiment allows to decrease a control voltage on all three modulators, while an output power of diffracted light will be close to the maximal value. For example, if the phase incursion of one modulator is equal to 4.82 radian at the complete range of a relief, then the output power of the light of the first three orders will be equal to 99%.

If the phase incursion is equal to 3.86 radian (80% from the optimal value equal to 4.82), then the power of the first three orders of diffraction of one modulator is equal to 92.2%. Switching on two or three modulators 3 leads to decrease of the power of the zero order down to 0.46% or 0.031% correspondingly. Thus, the usage of two or three modulators allows not only to obtain a necessary contrast but also to level the output power of diffracted light in the case of a drop of the signal voltage.

Figure 2:
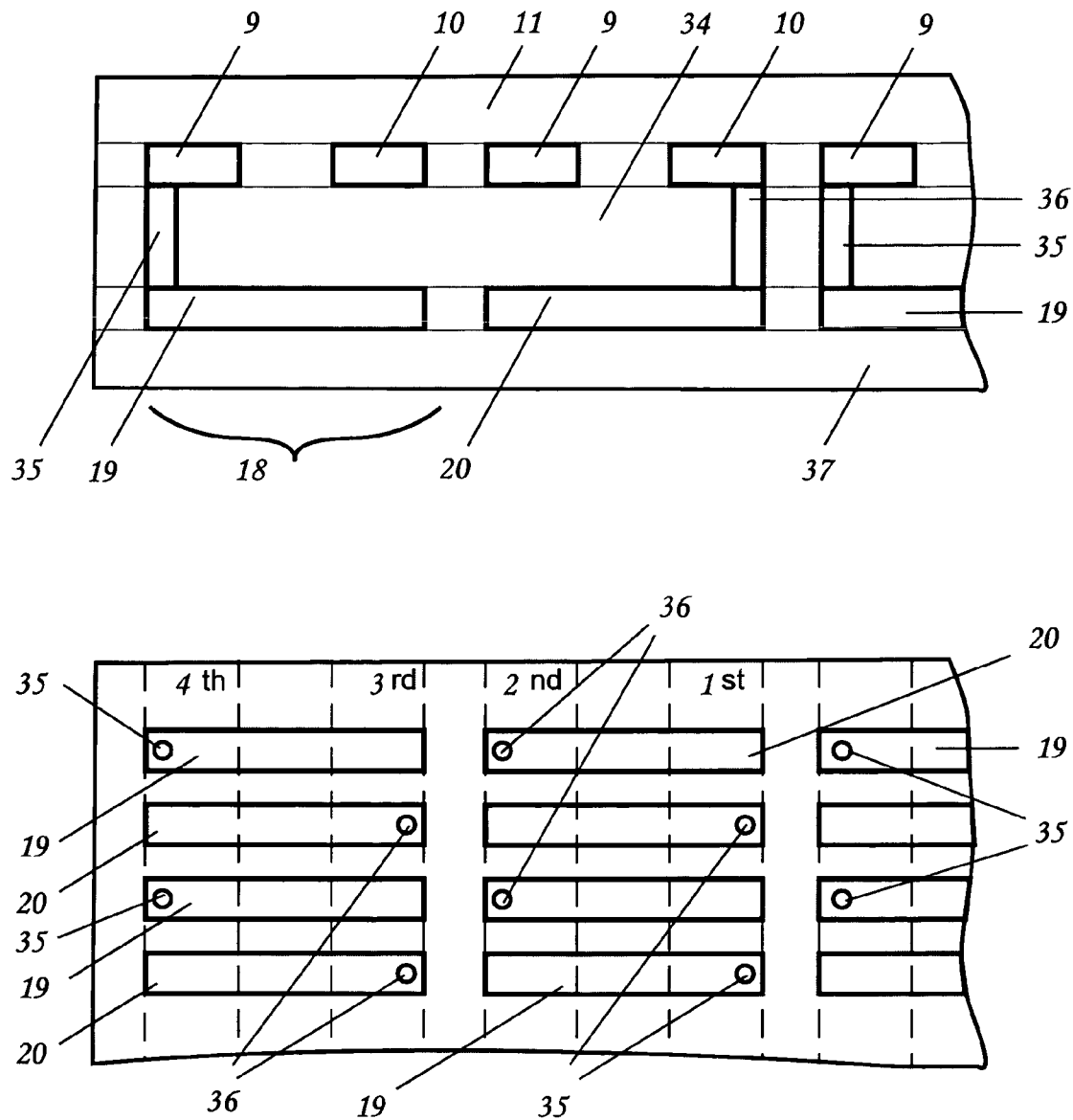
FIG. 2. shows a two-layer design of the teeth and control and ground electrodes in two projections.

According to another embodiment, due to the application of the dielectric layer 34, the electrodes 9 and 10 are arranged below the level of the combs' teeth 19 and 20 (FIG. 2). It allows to increase the area of the useful relief.

Figure 3:
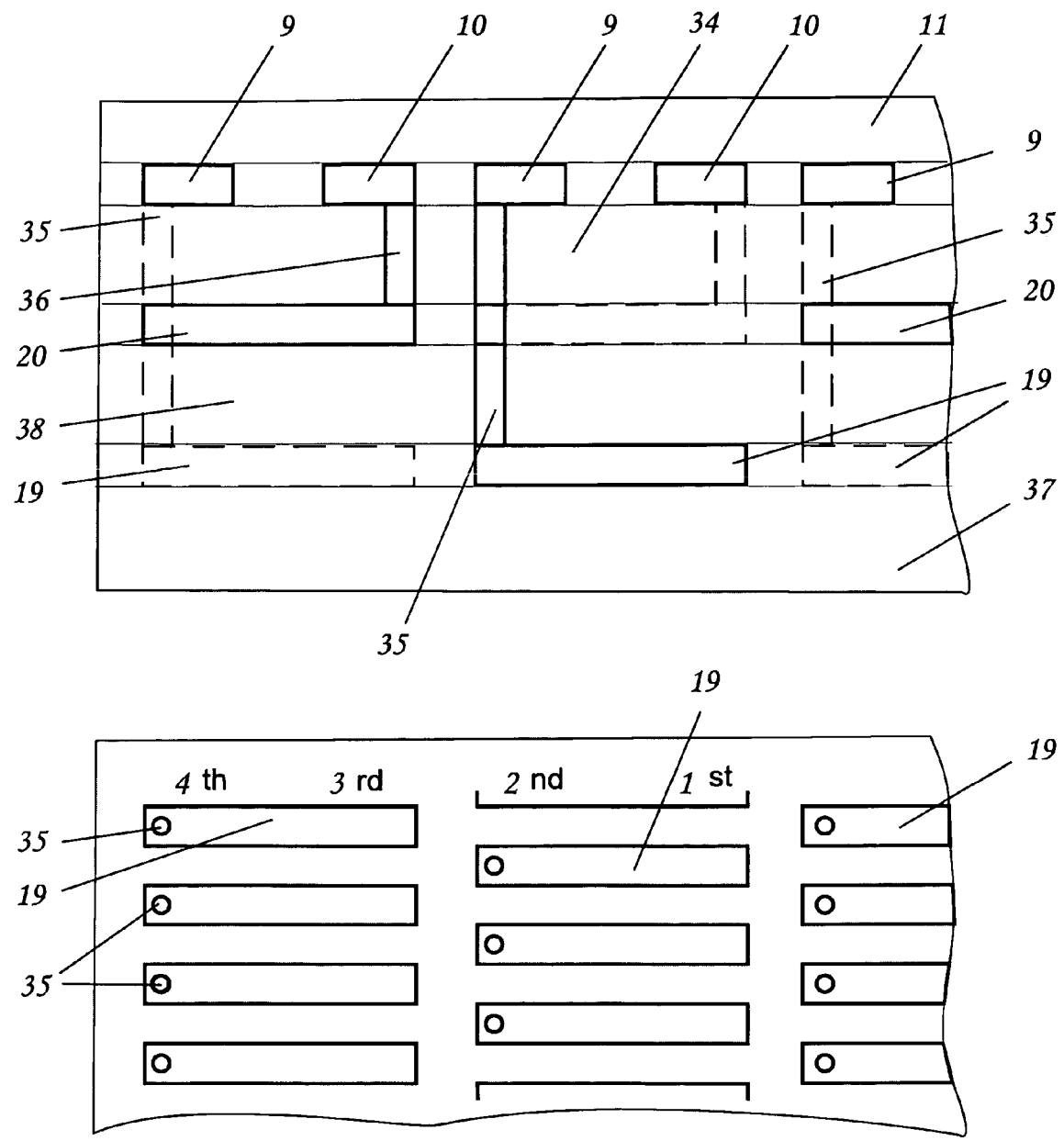
FIG. 3. shows a three-layer design of the teeth and control and ground electrodes in two projections.
Figure 4:
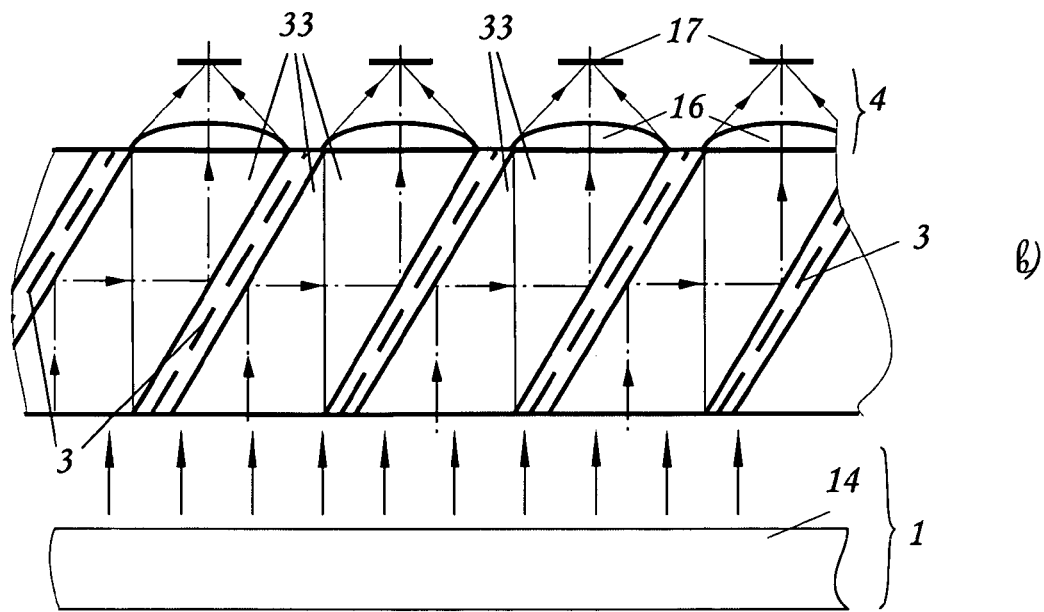
FIGS. 4a and 4b show an example of two variants of fragments of a matrix comprising M line elements, each element consisting of two prisms with two free leg sides located in parallel planes. In the first fragment on FIG. 4a, the optical lighter has a lens raster focusing light on the visualizing diaphragm. In the second fragment on FIG. 4b, the lens raster is inserted into the visualizer, and the optical lighter emits the parallel light flux falling on the first free leg side.
Figure 4:
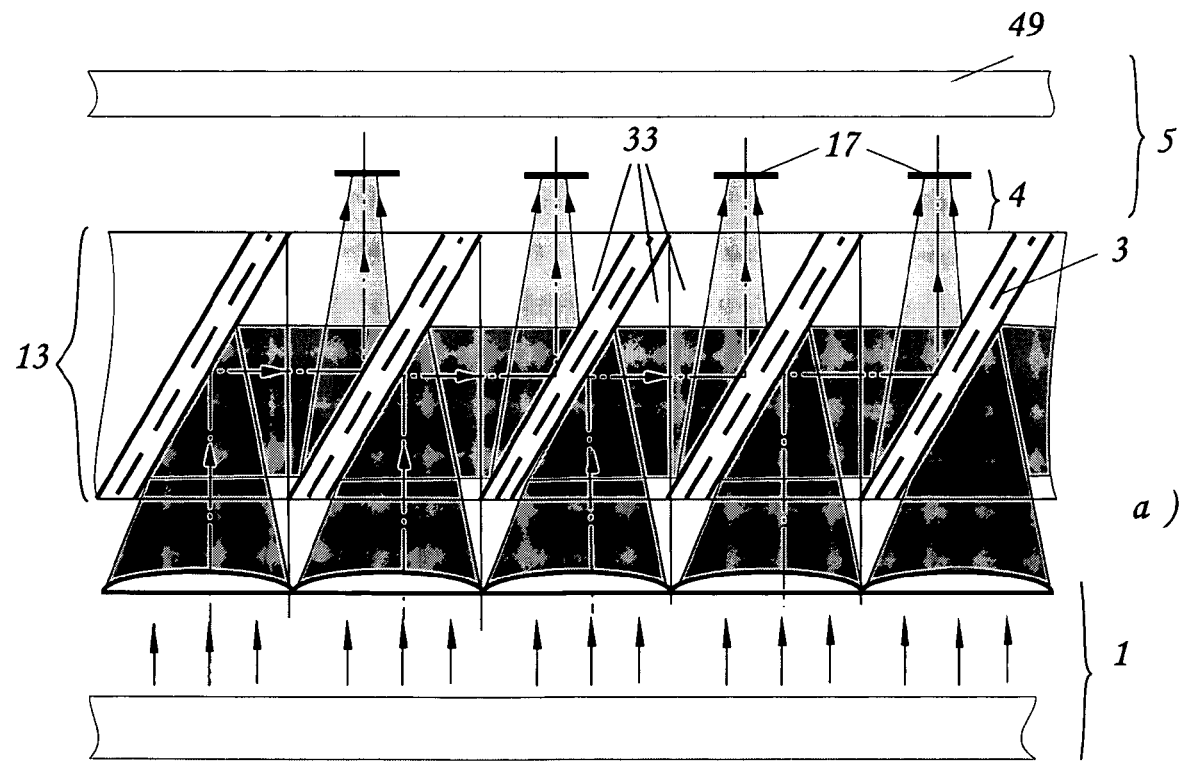
Figure 5:
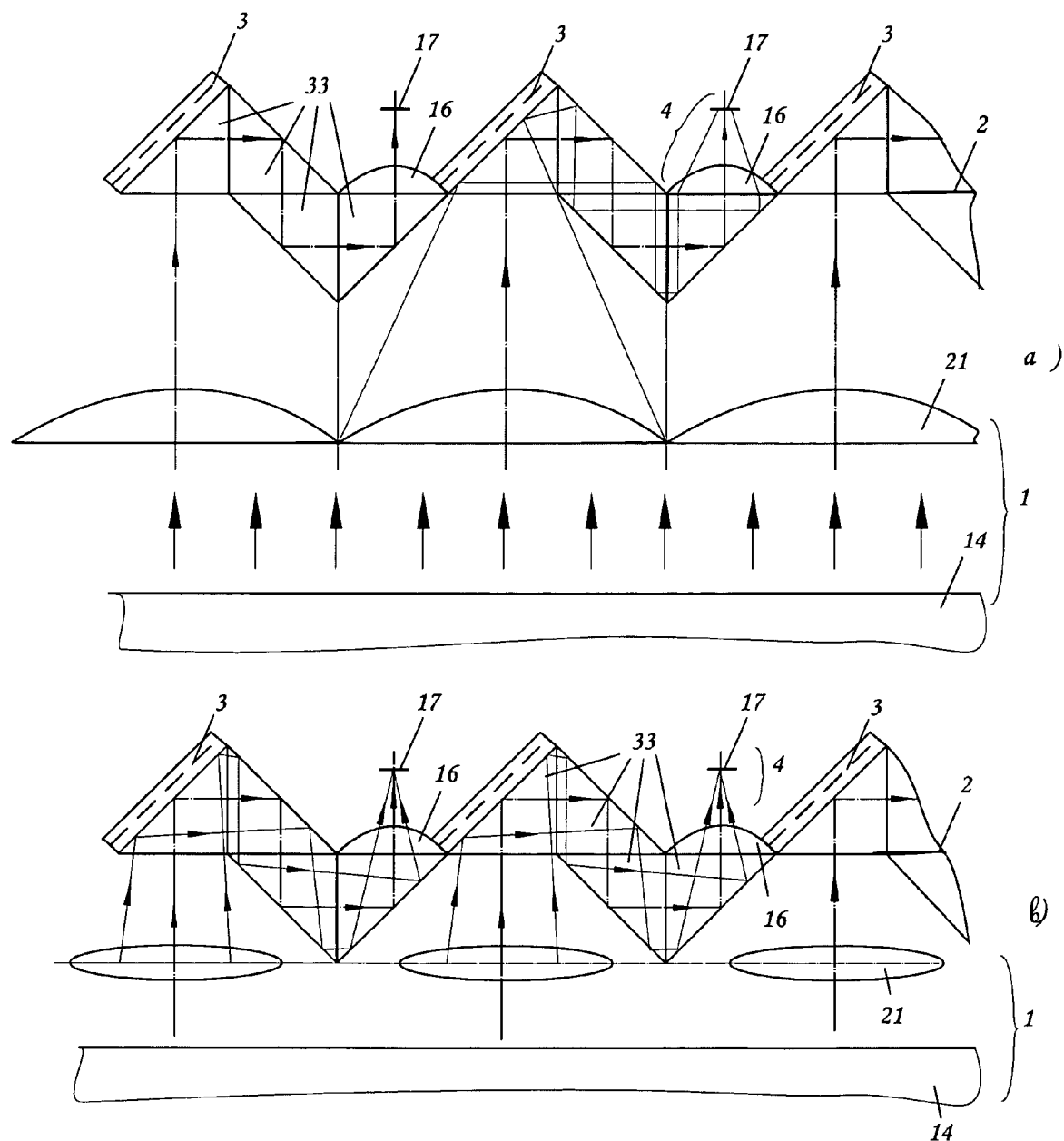
FIGS. 5a and 5b show an example of two fragments of a matrix comprising M line elements, each element consisting of four prisms with two free leg sides located in one plane. In the first fragment on FIG. 5a the optical lighter and the visualizator have lens rasters conjointly focusing light on the visualizing diaphragm. In the second fragment on FIG. 5b the lens raster of the optical lighter is focusing light on the visualizing diaphragm.
Figure 6:
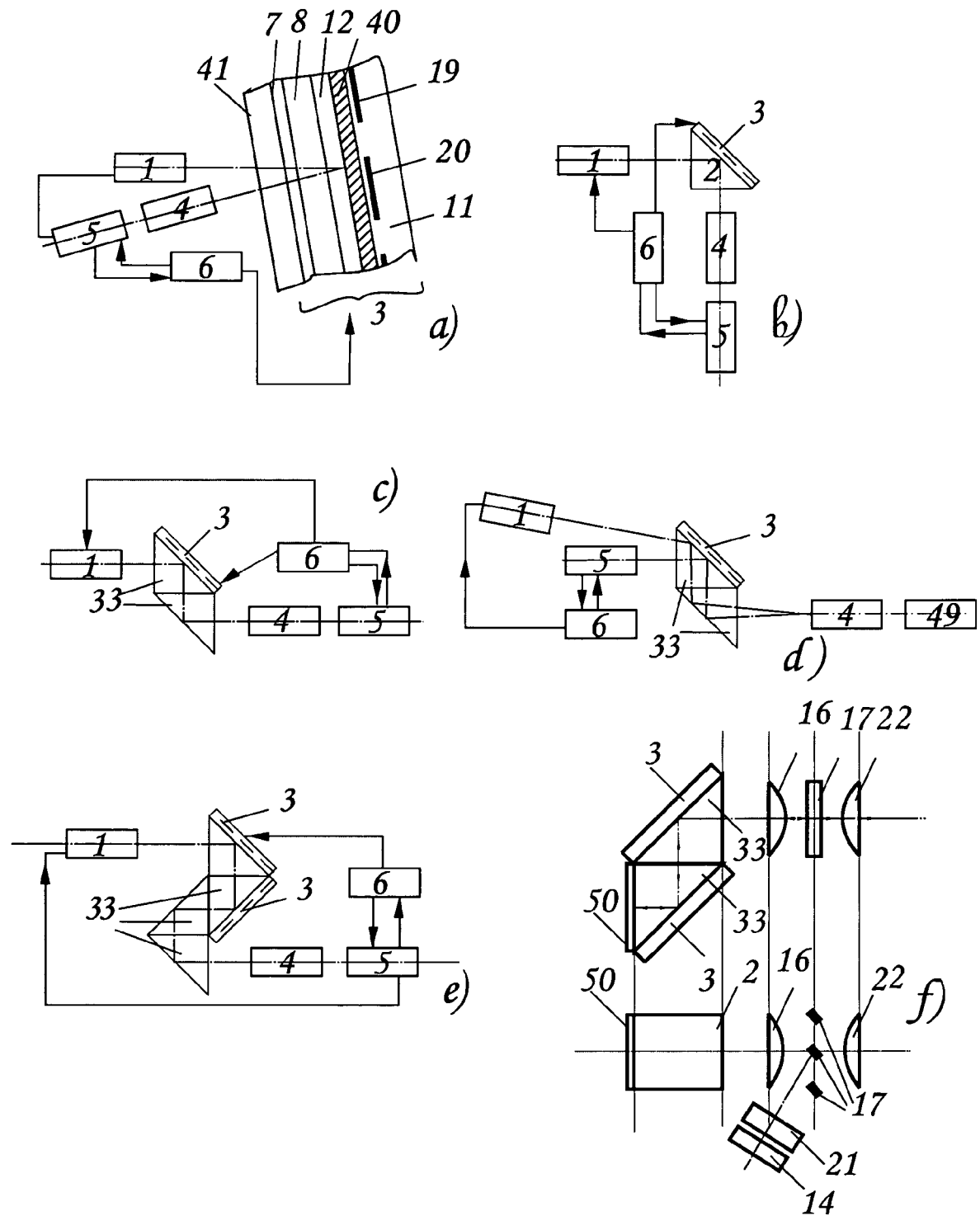
FIGS. 6a-6f show six examples of optical schemata and electric connections between the optical lighter, the modulator, the perception device and the control device.
Figure 7:
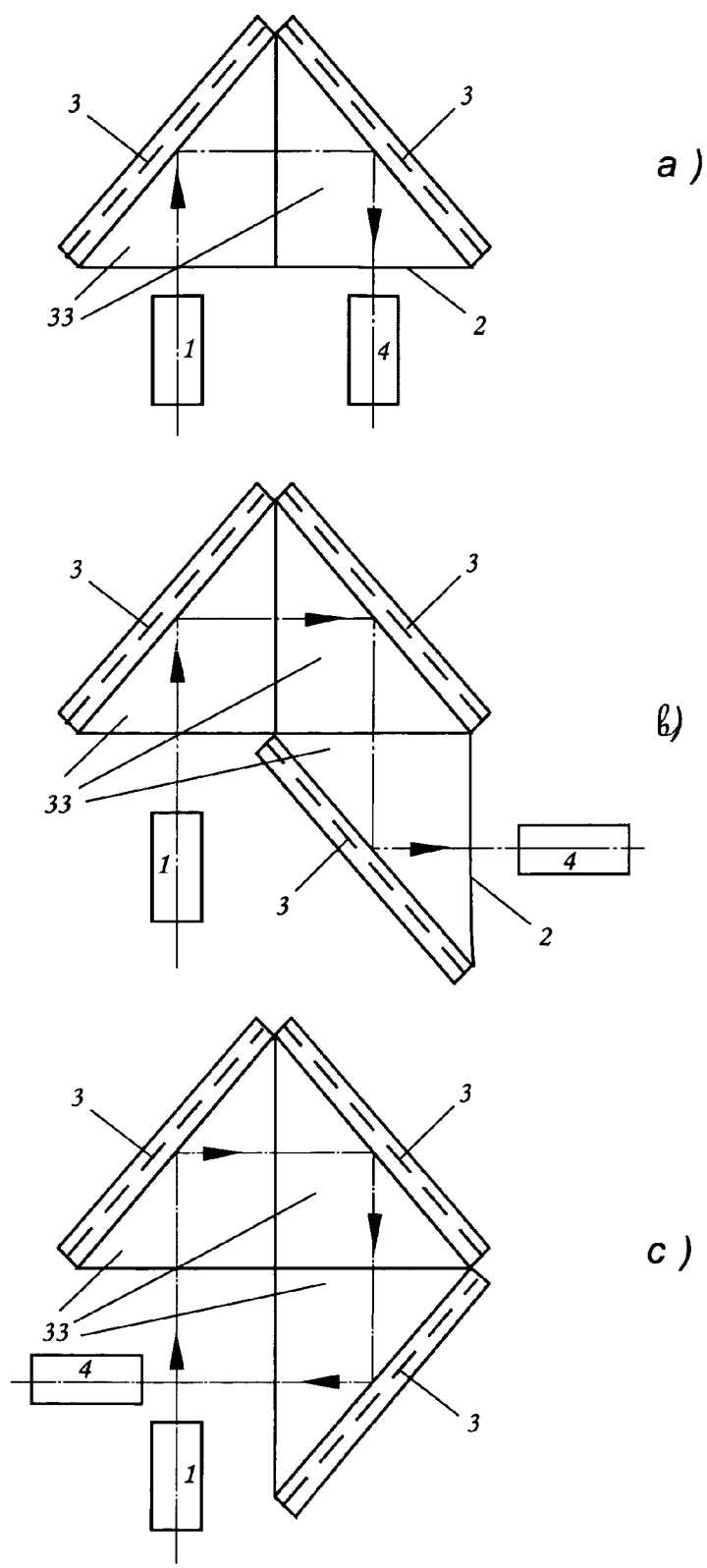
FIGS. 7a-7c show three variants of embodiment of the line element.
Figure 8:
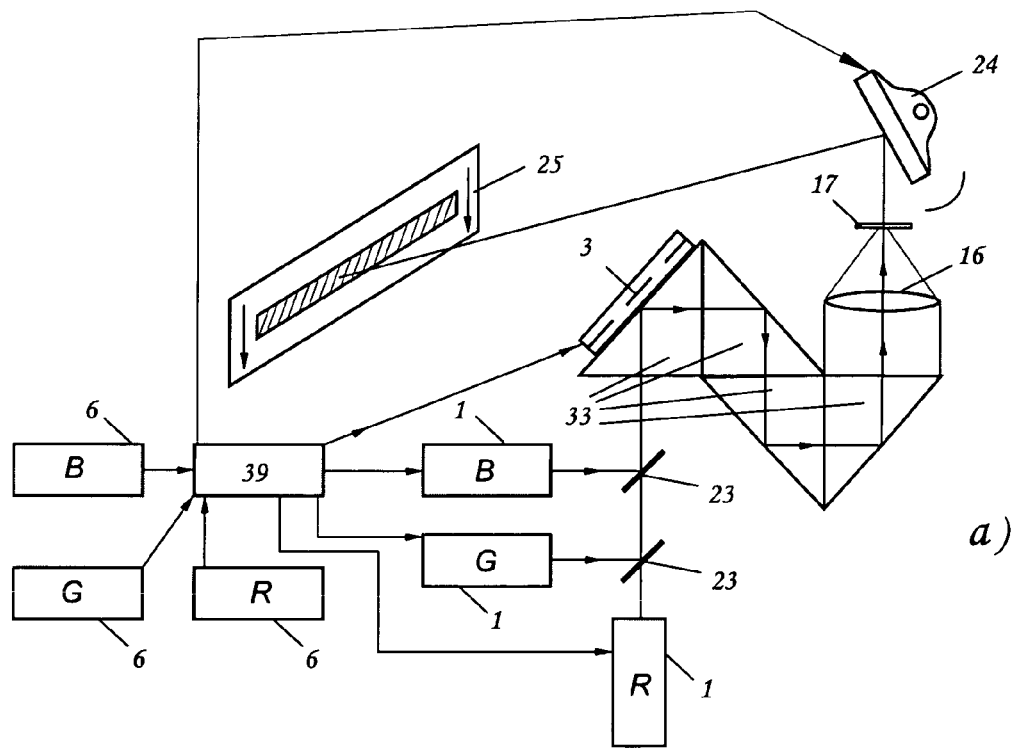
FIGS. 8a-8d show four examples of color projectors with line scanning.
Figure 8:
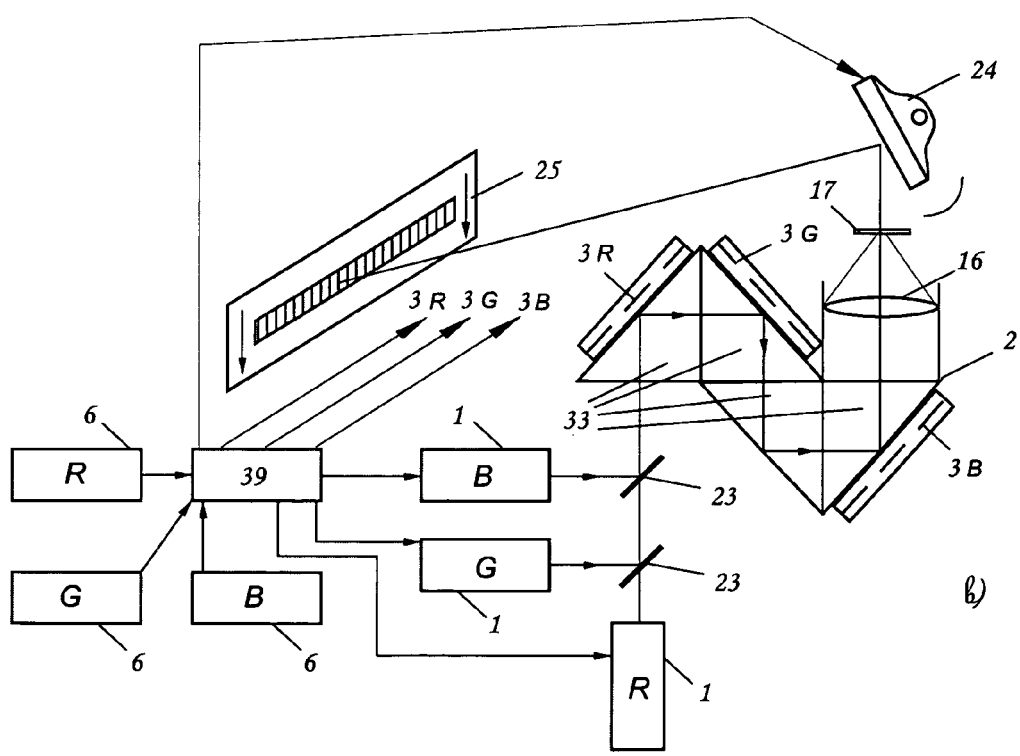
Figure 8:
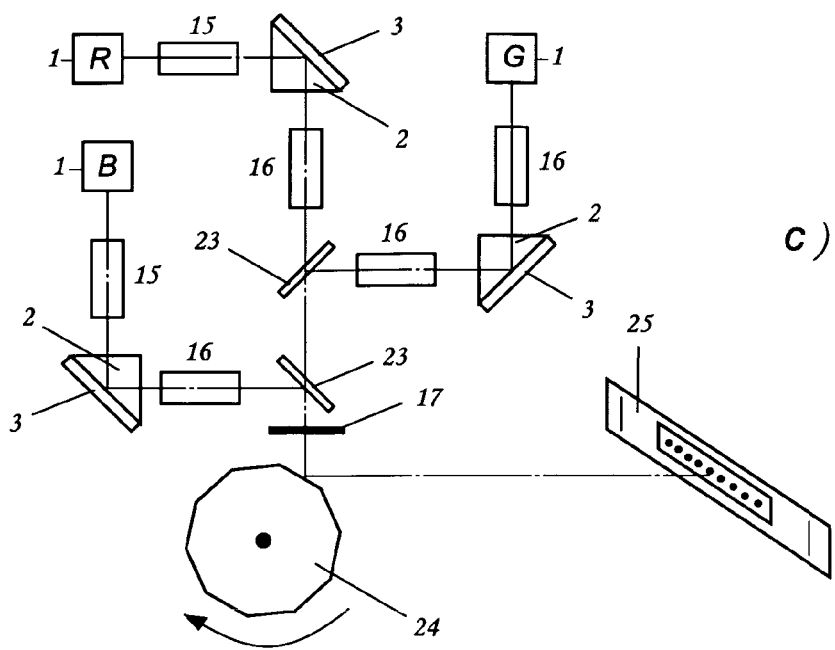
Figure 8:
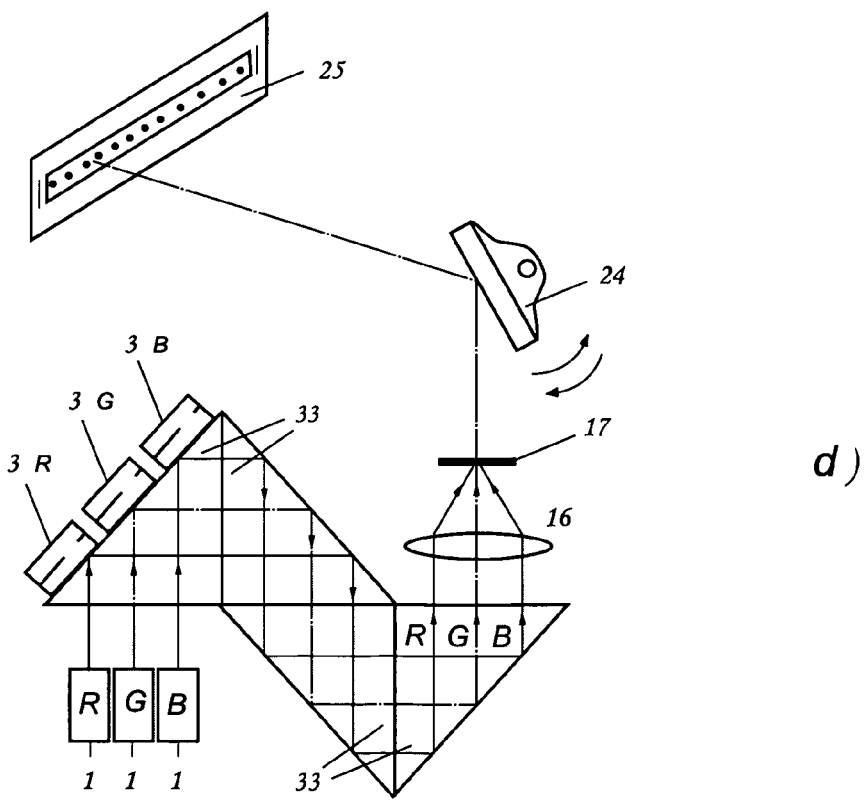
Figure 9:
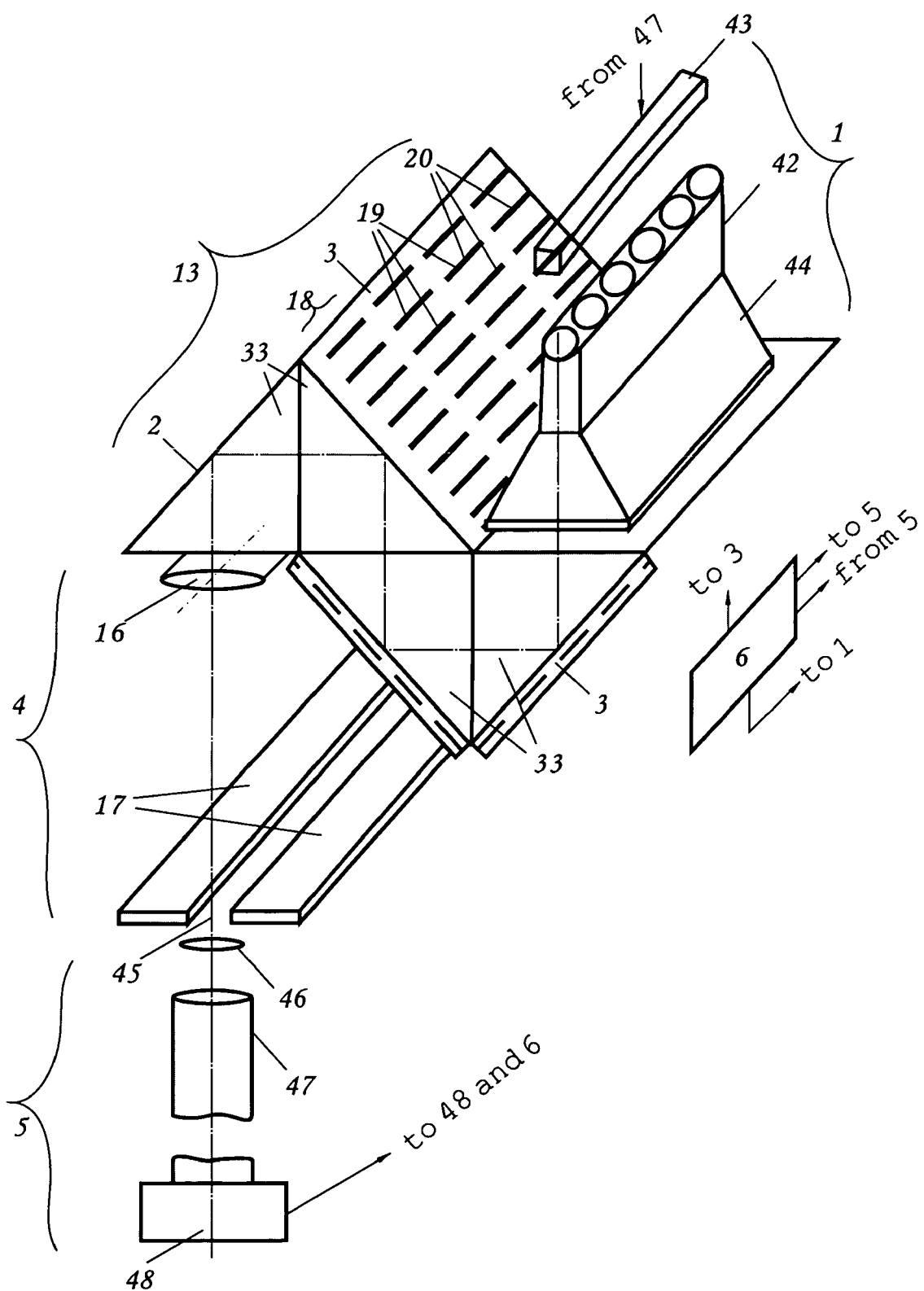
FIG. 9 shows a general design of the optical fiber switch with three line modulators.

FIG. 3 shows the construction of the comb's structure where only combs' teeth 19 are faced to the transparent gel-like layer 8. These combs' teeth 19 are connected with the electrode 9 and are shifted by a half-period for each pixel 18 in order to avoid the mutual affect. It is achieved by the introduction of two dielectric layers 34 and 38 into the device. A thin protective dielectric layer 37 can be applied for a mechanical protection and stabilization of electric parameters of the comb structure of the pixel 18. The construction of the comb structure shown on FIG. 3, additionally allows to improve resolution of this structure twofold, while the minimum distance between the adjacent electrodes is reduced threefold. The chequer-wise space disposition of the control teeth 19 and the ground teeth 20 additionally eliminates the mutual affect of the pixels.

In another embodiment (FIG. 4,5), the device operates realizing a matrix direct view display or a device of a frame record. In the case of application of the projection lens 22 and the screen 25 the device can operate as a tele-projector. M of the line elements 13, each of which consists of an even number of prisms 33, are located in one plane in a form of a linear matrix, while the first and the last free leg lateral sides of the line elements 13 arranged in parallel planes or in one plane are directed to the matrixes of M monochrome, three-colored or polychromatic optical lighters 1 and of M monochrome, three-colored or polychromatic visualizers 4, correspondingly. Thus, the matrix works as a transparent optical modulator. However, its sensitivity increases approximately in several times due to the prismatic elements. It allows to decrease voltage in several times correspondingly. M line elements 13 form a matrix in which a line consists of i pixels 18 of the line modulator 3, and a column consists of M line elements 13. In this case, the image is visualized in Fourier-plane due to the application of, for example, a mat glass. The observer sees the pixel 18 as a bright light spot formed by the highest orders of diffraction if a voltage on the control electrodes 9 is applied. It is known that pixels 18 can be switched on simultaneously or in line by line with accumulation of information on the intermediate carrier or to transfer the information in a real-time. Besides the application of this embodiment as the direct view display, it is possible to visualize an image on the screen using known projection optics, directional or dispersing, rear-projection or reflecting screens.

In another embodiment, the perception device 5 is made in the form of, for example, transparent or mat, or photosensitive, or thermosensitive material and is located after the matrix of visualizers 4 on the optical axis. Having passed the visualizers 4, light falls, for example, on a photosensitive material. The light power is thus transformed into gradation of darkening of a photographic paper or into another form of representation of light power into an image on a record carrier.

According to yet another embodiment, the device with one line modulator 3 and with three multi-colored optical lighters 1 operates as follows. In this case (FIGS. 1 and 8a) three control devices 6 switch on the single line modulator 3, the single optical lighter 1 and the means of scanning (scanner) 24 with the help of the color commutator 39. After making a choice of a color, all electronic devices in the control device 6 corresponding to the given color and optical devices operate as it is described above for the preferred embodiment of the invention.

According to the embodiment of the invention, in the device (FIGS. 1 and 8b) with three line modulators 3 and three multi-colored optical lighters 1, recording an image on the screen is carried out sequentially by each color channel. In this embodiment of invention, it is possible to achieve equality of dimensional frequency for all three line modulators 3 or, at least, quite close values of parameters by regulating of the distance from each modulator to the Fourier-objective 16.

In the device (FIGS. 1 and 8d) with three line modulators 3 applied to one or different sides of the triangular prism 33 and with three multi-colored optical lighters 1, recording of an image onto the screen is carried out simultaneously by each color channel. In this embodiment of the invention, as well as in the previous one, it is possible to achieve the equality of the dimensional frequency or, at least, quite close values of the parameters for all three line modulators 3 by regulating of a distance from each modulator to the Fourier-objective 16. Each line modulator 3 occupies one third of hypotenuse side of the prism 33. In order to improve a contrast and to reduce a voltage on the control electrodes 9, it is possible to apply two or three line modulators 3 identical for each color and switched on synchronously.

According to another embodiment (FIGS. 1 and 6a) in which the combs' teeth 19 and 20 are covered with the continuous dielectric mirror 40, the device operates as follows. Radiation from the optical lighter 1 is directed at an angle less than 90 degrees to the line modulator 3 located on the transparent plane-parallel plate 41. Radiation from the optical lighter 1 passes through the transparent electroconducting layer 7, the gel-like layer 8, the air gap 12, and then it is reflected from the dielectric mirror 37 and again passes through the transparent gel-like layer 8, the transparent electroconducting layer 7 and the transparent plane-parallel plate 41. In the absence of the relief on the gel-like layer 8 light in the visualizer 4 is blocked by the visualizing diaphragm 17. If a voltage is applied to the combs' teeth 19 and 20, the diffraction grating as a phase (geometrical) relief is formed on the surface of the transparent gel-like layer 8, and diffracted light, missing the visualizing diaphragm 17 falls into the perception device 5 which operation is described above. The sensitivity of the device according to this embodiment is twofold higher than in the transmissive variant of the prototype known from the prior art, due to a twice transmission of light through the transparent gel-like layer 8. In the line and the matrix variants of this modification, pixels 18 can be switched on simultaneously or sequentially by the known methods.

In another embodiment (FIG. 9), the device operates as follows. Taking into account, that line modulators 3 with the transparent gel-like layer 8 can operate with a frequency of a signal switching up to 500 kH and the application of two or more line modulators 3 allows to achieve contrast of 1:1000, the device is expedient to use as a fiber optical switch. Laser monochrome or polychrome radiation from a monochrome or polychrome laser light source of information 43 proceeds into the input optical fiber 42 and then is collimated by the collimator 44. Further, the parallel beam of radiation being reflected from all hypotenuse sides of the prisms 33, comes onto the cylindrical Fourier-objective 16 which focuses light into one hole or the matrix of holes 45 of the visualizing diaphragm 17. As the objective 46 is located towards the hole 45 closer than the focal distance, the light passing through this objective falls on the output optical fiber 47 and is registered by the registration of information device 48 which in the case of fluctuation of a signal from a nominal value feeds a signal to the information source 43. If the control device 6 applies a voltage to the control electrodes 9 of the line modulators 3, the diffracted light beam is blocked by the visualizing diaphragm 17, and light does not enter the output optical fiber 47. It is known that the sinusoidal phase grating at a phase incursion equal to 4.82 radian removes 100% of light from the zero order. The inevitable noises originating after the transmission of light through the first line modulator 3 are removed from the zero order by the second and the third modulators 3 as it is described above. Thus, high contrast of the optical switch is achieved. Apparently the device can work as an attenuator of a light flux in the case of regulating the voltage incoming to the electrodes 9.

In another embodiment (FIG. 9), the device operates as follows. In the previous variant of the embodiment, the opaque visualizing diaphragm 17 has the matrix of holes 45 transmitting radiation of a plus-minus first and/or another higher order of diffraction and the visualizer 4 for each line modulator 3 is made in such a way that the objective 46 focusing light on the output optical fiber 47 is located opposite to each matrix of the holes 45. Thus, the device functions as a filter of light frequencies. This is a result of the fact that the position of the highest orders of diffraction on the visualizing diaphragm 17 will be different for different light frequencies. The perception devices 5 arranged opposite to each hole 45 will register different light frequencies.

In another embodiment of the invention (FIG. 6*d*), the device operates as follows. The light from the optical lighter 1 passes one or several sides of prisms 33 of the line element 13 at an angle, less than 90 degrees. In the absence of a relief on the line modulators 3, the light falls on the Fourier-objective 16 and is focused on the visualizing diaphragm 17 blocking light of the zero order of diffraction. The visualizing diaphragm 17 covered with the mirror is applied parallel to the free side of the prism 33 of the line modulator 3, and light with displacement from the initial optical axis after several reflections finally falls perpendicularly to the first free leg side of the prism 33 of the line element 13 and then—into the perception device 5. If one or several modulators 3 are switched on, the part or all light from the zero order is transferred into the highest orders on the phase plane located in the plane of the visualizing diaphragm 17 and falls on the light-absorbing device 49 or on the second perception device 5. The first perception device 5 in this case is not lightened. Thus, a dark field in the first perception device 5 and a light field in the second perception device 5 correspond to a relief record in the line modulator 3. If the line modulators 3 are turned out, the first perception device 5 is spotlit, and the second perception device 5 is not spotlit. This device can operate at a bright sunlight as a two-sided panel or a direct view display, and also in the case of the usage of the lengthy optical lighters 1 described above.

In another embodiment, the device operates as follows. In order to improve the contrast and effectiveness of the line modulator 3 in the line element 13 the combs' teeth 19 and 20 are covered with the continuous dielectric mirror 40 in such a way that light falling on the transparent gel-like layer 8 in case of a failure of the total internal reflection passes through the transparent gel-like layer, reflects from the continuous dielectric mirror 40 and again passes through the transparent gel-like layer 8. In the absence of the modulator 3 on the hypotenuse side of the prism 33, the hypotenuse side is covered with a common mirror. In this case, the light falling on the side at an angle less than the total internal reflection angle falls into the visualizer 4.

In another embodiment the device operates as follows (FIG. 6*f*). Light from the optical lighter 1, being reflected from the mirror visualizing diaphragm 17 falls on the Fourier-objective 16. Then the light modulated by the line modulators 3 reaches the last free leg side of the prism 33 of the line modulator 3. As this leg side is covered with the common mirror 50, the light passes in the reverse order to the optical lighter 1 in the absence of a relief. If there is a relief record on at least one of the line modulators, then the highest orders of diffraction fall on the projection lens 22 though the slits of the mirror visualizing diaphragm 17. Thus, light on one line modulator 3 diffracts twice improving sensitivity and contrast of the line element 13. In the example represented on FIG. 6*f*, light diffracts four times, which results in almost ideal contrast of the screen image.

The gel-like layer for the electrooptical converter according to the present invention is a product of the reaction of the components of the gel-like composition which includes polyvinylsiloxane $(CH_2=CH)_3SiO[(CH_3)_2SiO]_mSi(CH=CH_2)_3$ with the molecular mass of 10000-16000 and viscosity of 800-1000 centistokes, oligohydridesiloxane $(CH_3)_3SiO\{[(CH_3)_2SiO][CH_3SiO(H)]\}Si(CH_3)_3$ as a cross-linking agent, with hydride groups content of 10-15% and viscosity of 50-100 centistokes, polymethylsiloxane fluid $(CH_3)_3SiO[(CH_3)_2SiO]Si(CH_3)_3$ as a plasticizer with viscosity of 5-20 centistokes, 0.1% solution of chloroplatinic acid in an organic solvent or its complex with tetravinylsilane as a catalyst of hardening, in the following proportion (mass parts): polyvinylsiloxane—100, oligohydridesiloxane—15-25, polymethylsiloxane fluid—150-300, 0.1% solution of chloroplatinic acid in the organic solvent or its complex with tetravinylsilane—0.3-2. This gel-like layer does not require a presence of moisture during the gel formation and does not also require a containment hermetically sealed from moisture in operation.

The method of preparation of the gel-like layer for the electrooptical converter includes mixing of 100 mass parts of polyvinylsiloxane $(CH_2=CH)_3SiO[(CH_3)_2SiO]_mSi(CH=CH_2)_3$ with a molecular mass of 10000-16000 and viscosity of 800-1000 centistokes with 15-25 mass parts of oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes. After mixing 150-300 mass parts of polymethylsiloxane fluid $(CH_3)_3SiO[(CH_3)_2SiO]Si(CH_3)_3$ with viscosity of 5-20 centistokes is added. After the repeated mixing 0.3-2 mass parts of 0.1% solution of chloroplatinic acid in the organic solvent or its complex with tetravinylsilane is added. Then the resulting composition is mixed and applied to the electroconducting transparent layer as a layer of a uniform thickness, preferably, on the expiry of 1-20 min after the end of mixing.

Figure 13:
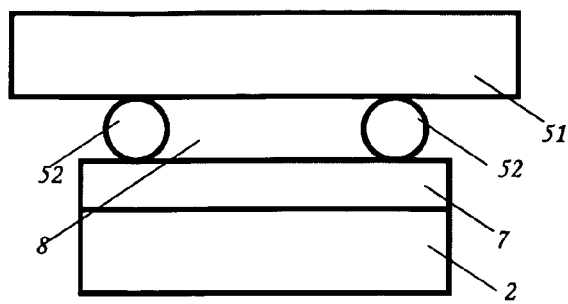
FIG. 13 shows a method of formation of the gel-like layer with the help of the main spacers.
Figure 14:
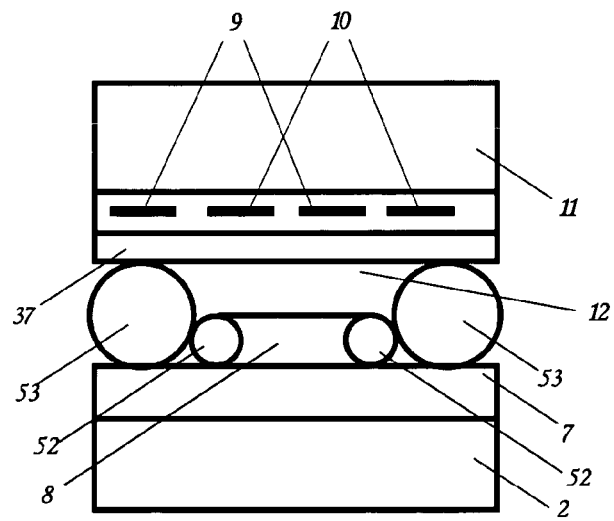
FIG. 14 shows a method of assembling of the line modulator with the help of additional spacers.

Another embodiment of the method of preparation of the gel-like layer for the electrooptical converter includes mixing of 100 mass parts of polyvinylsiloxane $(CH_2=CH)_3SiO[(CH_3)_2SiO]_mSi(CH=CH_2)_3$ with molecular mass of 10000-16000 and viscosity of 800-1000 cantistokes with 15-25 mass parts of oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes. After mixing, 150-300 mass parts of polymethylsiloxane fluid $(CH_3)_3SiO[(CH_3)_2SiO]Si(CH_3)_3$ with viscosity of 5-20 centistokes is added. After the repeated mixing 0.3-2 mass parts of 0.1% solution of chloroplatinic acid in the organic solvent or its complex with tetravinylsilane is added. Then the resulting composition is mixed and applied to the electroconducting transparent layer 7 as a layer of a uniform thickness after the end of mixing. Then the obtained structure is covered with an additional plate 51 with an optical flat surface, and the thickness of the transparent gel-like layer 8 is flattened by the main spacers 52, arranged between the transparent electroconducting layer 7 and the additional plate 51 (FIGS. 13, 14). Then the obtained construction is placed into the oven and kept at the temperature of 70-90° C. for about 2-4 hours. Then the additional plate 51 is separated, and the gel-like layer is covered with the second support 11 with the control electrodes 9 and the ground electrodes 10 applied to it, the electrodes being covered with the thin protective dielectric layer 37, while the air gap 12 is assigned by the additional spacers 53, which are bigger than the main ones 52. The additional plate 51 is preferably made of glass.

Another variant of the method of preparation of the gel-like layer for the electrooptical converter includes mixing of 100 mass parts of polyvinylsiloxane $(CH_2=CH)_3SiO[(CH_3)_2SiO]_mSi(CH=CH_2)_3$ with the molecular mass of 10000-16000 and viscosity of 800-1000 centistokes with 15-25 mass parts of oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes. After mixing, 150-300 mass parts of polymethylsiloxane fluid $(CH_3)_3SiO[(CH_3)_2SiO]Si(CH_3)_3$ with viscosity of 5-20 centistokes is added. After the second mixing, 0.3-2 mass parts of 0.1% solution of chloroplatinic acid in an organic solvent or its complex with tetravinylsilane is added. Then the resulting composition is mixed and applied to the electroconducting transparent layer 7 as a layer of a uniform thickness after the end of mixing. Then the obtained structure is covered with an additional plate 51 with an optical flat surface, and the thickness of the gel-like layer 8 is flattened by the main spacers 52, arranged between the transparent electroconducting layer 7 and the additional plate 51. Then the obtained structure is placed into an oven at the temperature of 70-90° C. for approximately 1-2 hours, then it is cooled down to ambient temperature. After that the additional plate 51 is separated. Then, the gel-like layer 8 located on the transparent electroconducting layer 7 is again placed into the oven and kept at the temperature of 70-90° C. up to complete cross-linking of the gel for about 1-3 hours (FIGS. 13, 14).

In another embodiment, the application of the layer is carried out by a consecutive application (by pouring) of one or some of additional gel layers on the first or the previous cross-linked and cooled gel layer.

Figure 15:
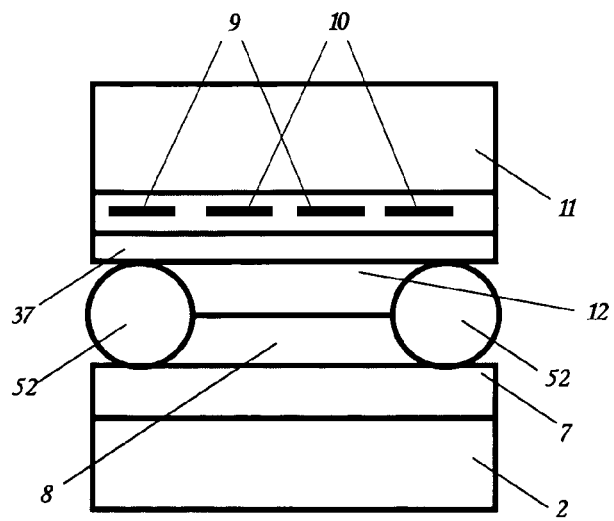
FIG. 15 shows a method of assembling of the line modulator with the help of the main spacers due to the gel-like layer shrinkage after it is cross-linked.

In another embodiment, the gap is defined by the main spacers 52 after complete cross-linking, contraction and cooling of the gel down to ambient temperature (FIG. 15).

In another embodiment, the additional plate 51 is covered with an antiadhesive layer. Preferably a surface-active substance, e.g. sulfanol-π is used as an antiadhesive layer. At the beginning, a diluted solution of sulfanol-π in acetone or water is prepared. Then the solution is filtered twice to remove the particles of low solubility. During vaporization of the solution applied to the additional plate 51, a thin antiadhesion layer remains on its surface. Further, the antiadhesive layer is heated for one hour at 40° C. The use of the antiadhesive layer allows to obtain the quality of the layers up to 100%.

Besides, the additional plate is preferably treated with plasma or other clearing irradiation by known methods.

The composition for the realization of the method of preparation of the gel-like layer for the electrooptical converters includes polyvinylsiloxane $(CH_2=CH)_3SiO[(CH_3)_2SiO]_mSi(CH=CH_2)_3$ with molecular mass of 10000-16000 and viscosity of 800-1000 centistokes, oligohydridesiloxane $(CH_3)_3SiO\{[(CH_3)_2SiO][CH_3SiO(H)]\}Si(CH_3)_3$ as a cross-linking agent with hydride groups content of 10-15% and viscosity of 50-100 centistokes, polymethylsiloxane fluid $(CH_3)_3SiO[(CH_3)_2SiO]Si(CH_3)_3$ as a plasticizer with viscosity of 5-20 centistokes, 0.1% solution of chloroplatinic acid in an organic solvent or its complex with tetravinylsilane as a catalyst of hardening. The ratio of the mixture's components is the following (mass parts): polyvinylsiloxane—100, oligohydridesiloxane—15-25, polymethylsiloxane fluid—150-300, 0.1% solution of chloroplatinic acid in the organic solvent or its complex with tetravinylsilane—0.3-2.

EXAMPLE 1

Polyvinylsiloxane (100 mass parts) and the cross-linking agent oligohydridesiloxane (20 mass parts) are mixed. After premixing, 150 mass parts of polymethylsiloxane fluid is added and the composition is thoroughly mixed again. Then 1 mass part of 0.1% solution of chloroplatinic acid in the organic solvent (isopropyl alcohol) is added. The composition is thoroughly mixed within 5 minutes and applied to the electroconducting transparent layer on the expiry of 10 minutes after the end of mixing.

The device according to the present invention can be made as follows. The prism 33 (or the transparent plane-parallel plate 41) and the second support 11 can be made of glass, the transparent electroconducting layer 7 can be made of indium oxide, the transparent gel-like layer 8 is made in the form of polyorganosiloxane gel. The electrodes 9 and 10, the combs' teeth 19 and 20, and the contacts 35 and 36 can be made of aluminum, chrome, molybdenum. The dielectric layers 34, 37 and 38 can be made of silicon nitride. Standard units and blocks can be used as the remaining elements and blocks. The wavelength of light depends on the particular application and can be selected, for example, in a visible range of a spectrum. It is possible to select the air gap 12, for example, of 5 μm, and the width of the transparent gel-like layer 8, for example, of 30 μm. The width of the above-mentioned electrodes 9 and 10, the teeth 19 and 20 can be varied from about 0.1 μm up to about 0.01 μm. The electric parameters used in the modulator 3, can be selected, for example, as follows: bias voltage is 50 Volt, signal voltage is 15 Volt, impulse of corrective action is 5 Volt, the period of signal sequence is 10 microseconds.

FIG. 10a shows the typical time oscillogram of modification of the relief depth, A (t) (in relative unites) on the transparent gel-like layer 8 depending on the action of electric impulse Ui with duration of one microsecond. FIG. 10b shows the oscillogram of time modification of the depth of the relief A (t) upon the duration of the electric impulse Ui of two microseconds. The gap 12 is 3 microns and the width of the teeth 19 and 20 is two microns in both cases.

For example, semiconducting lasers or copper vapor lasers, or gold vapour lasers, or strontium vapour lasers, as well as gaseous lasers and thermal light sources can be used as the light source 14.

The optical parameters of the components are calculated by common methods. Two elementary calculations for the monochrome line element 13 with two prisms 33 (Example 2) and for the three-colored line element 13 with four prisms 33 (Example 3) are given below. The dispositions of the cylindrical objectives are selected to be different.

EXAMPLE 2

Input parameters for calculation (FIG. 11) are the following. The size of the edge of the leg lateral side of the triangular prism 33 with the base in the form of a rectangular isosceles triangle is equal to ρ. The angle of divergence of radiation in the air is θ. The index of refraction of the medium is n. The wavelength of light in the air is $\lambda_l$. The maximum used order of diffraction is N (±1, . . . ,±N). We suppose that $d_1=d_2=d/2$ (FIG. 11).

Let us enter the general formulae for performing calculation.

The size of the visualizing diaphragm 17 is equal to a linear distance between the neighbor orders of diffraction (in particular between 0-th and 1-st), $$h=p/(2N+1) \qquad (1)$$

The angle of radiation divergence in the medium is equal to θ/n

The wavelength in the medium is $\lambda_l/n$.

$$\text{The distance } d=hn/\theta-p=p(n/((2N+1)\theta)-1) \qquad (2)$$

The angle of divergence between the neighbor orders of diffraction $$\alpha=(\lambda_l/n)/\lambda_m \qquad (3)$$

In order to avoid overlapping of the neighbor orders of diffraction $$\alpha=h/(d_1+p)=2h/(d+2p) \qquad (4)$$

Taking into account (2), (3) and (4), the reduced period of a microrelief is $$(5) \qquad \lambda_m=\lambda_l(d+2p)/(2nh)=\lambda_l(1/\theta+(2N+1)/n)/2$$

The physical period of the microrelief is $$\Lambda_m = \lambda_m \sqrt{2} = \lambda_l(1/\theta + (2N+1)/n)/\sqrt{2} \quad (6)$$

The focal distance of the lens in the medium is $$f_p = d + p = pn/((2N+1)\theta) \quad (7)$$

Focal distance of the lens in the air $f = f_p/n$, $$f = f_p/n = p/((2N+1)\theta) \quad (8)$$

Let us give a concrete example of performing calculation using the following parameters:
$\theta = 0.05, \lambda_l = 0.56$ μm, $p = 0.4$ mm, $n = 1.59$, $N = 2$ According to (2), the distance $d = hn/\theta - p = p(n/((2N+1)\theta) - 1) = 2.14$ mm, According to (1), the size of the visualizing diaphragm $h = p/(2N+1) = 80$ microns, According to (6), the physical period of the microrelief on the side of the prism $$\Lambda_m \approx 0.707 \lambda_l(1/\theta + (2N+1)/n) = 9.16 \text{ microns } (109 \text{ mm}^{-1}).$$

EXAMPLE 3

Figure 12:
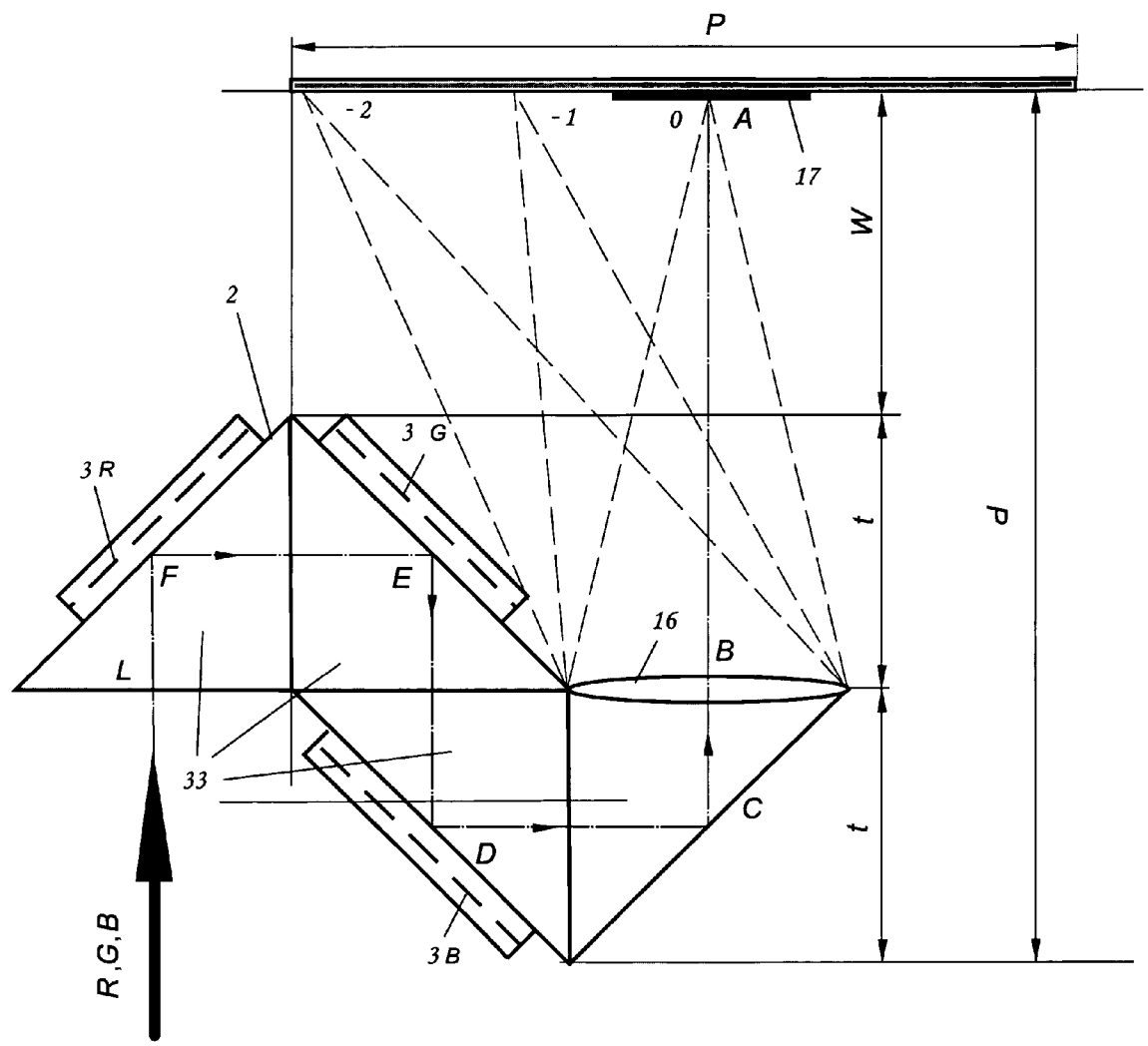
FIG. 12 shows a calculation schema for a three-colored line element with four prisms and sequential combination of colors.

Represented is one more example of calculation of the three-colored line element 13 with four prisms 33. (FIG. 12)

The input parameters for calculation are the following. The lens is located in point B. The input parallel luminous flux passes through the side L. All optical path ABCDEFL is made in the medium with the refraction index equal to n. Reflecting sides of the prisms (F, E, D, C) are arranged at the angle of 45°. Three line modulators 3 with the different periods of relief are located on the sides D, E, F. The wavelength of light in the air is equal to $\lambda_1$ ($\lambda_D$, $\lambda_E$, $\lambda_F$ correspondingly). Angles of divergence for radiations of different colors are equal to $\theta_D$, $\theta_E$, $\theta_F$ correspondingly. The maximum angle of divergence is $\theta = \max\{\theta_D, \theta_E, \theta_F\}$. The reduced period of the grating (a period of projection of the grating on perpendicular section of the light beam) is $\lambda_m$ ($\lambda_{mD}$, $\lambda_{mE}$, $\lambda_{mF}$ for different wavelengths of light correspondingly). The physical period of the microrelief on the side of the prism is $\Lambda_m = \lambda_m \sqrt{2}$ ($\Lambda_{mD}$, $\Lambda_{mE}$, $\Lambda_{mF}$ for different wavelengths of light correspondingly). The distance from the visualizing diaphragm (a point of focusing of 0-th order) to the grating is equal to $s_1$ ($s_D$, $s_E$, $s_F$ for different wavelengths of light correspondingly). Maximum used order of diffraction is N (given).

The size of perpendicular sides of the prisms (see. FIG. 12) is $$t = (AB) = p/3 \quad (9)$$

The total overall height of the pixel is $$d = 2t + w = 2p/3 + w \quad (10)$$

The complete optical path from the visualizing diaphragm to the input side (ABCDEFL) is $$s = 5t + w = 5p/3 + w \quad (11)$$

The size of the visualizing diaphragm is equal to the linear distance between the neighbour orders of diffraction (in particular between 0-th and 1-st), and is $$h = p/(2N+1) \quad (12)$$

The angle of radiation divergence in the medium is equal to $\theta/n$

The wavelength in the medium is $\lambda_l/n$.

The maximum optical path defined by the divergence is $$(13) \quad s = h/(\theta/n) = hn/\theta = pn/((2N+1)\theta)$$

Taking into account (11) $5p/3 + w = pn/((2N+1)\theta)$, i.e. the maximum magnitude of w is $$w = p(n/((2N+1)\theta) - 5/3) \quad (14)$$

The corresponding overall size of the pixel from (10) is $$d = 2p/3 + w = p(n/((2N+1)\theta) - 1) \quad (14a)$$

Taking into account (14), the distance from the grating D to the visualizing diaphragm (ABCD) for $\lambda_D$ is equal to $$s_D = 2t + t/2 + w = 5t/2 + w = 5p/6 + w = p(n/((2N+1)\theta) - 5/6) \quad (15D)$$

Taking into account (14), the distance from the grating E to the visualizing diaphragm (ABCDE) for $\lambda_E$ is equal to $$s_E = 3t + t/2 + w = 7t/2 + w = 7p/6 + w = p(n/((2N+1)\theta) - 3/6) \quad (15E)$$

Taking into account (14), the distance from the grating F to the visualizing diaphragm (ABCDEF) for $\lambda_F$ is equal to $$s_F = 4t + t/2 + w = 9t/2 + w = 9p/6 + w = 3p/2 + w = p(n/((2N+1)\theta) - 1/6) \quad (15F)$$

The angle between the neighbor orders of diffraction is $$\alpha = (\lambda_l/n)/\lambda_m \quad (16)$$

In order to avoid overlapping of the neighbor orders of diffraction $$\alpha = h/s_1 \quad (17)$$

According to (16) and (17), the reduced period of the microrelief is $$\lambda_m = s_1 \lambda_l/(nh) \quad (18)$$

Taking into account (12), the reduced period of the microrelief is $$\lambda_m = s_1 \lambda_l (2N+1)/(np) \quad (19)$$

Taking into account (15) for different gratings (for different wavelengths correspondingly) the reduced period of the microrelief is $$\lambda_{mD} = s_D \lambda_D (2N+1)/(np) = \lambda_D(1/\theta - (5/6)(2N+1)/n) \quad (19D)$$

$$\lambda_{mE} = s_E \lambda_E (2N+1)/(np) = \lambda_E(1/\theta - (3/6)(2N+1)/n) \quad (19E)$$

$$\lambda_{mF} = s_F \lambda_F (2N+1)/(np) = \lambda_F(1/\theta - (1/6)(2N+1)/n) \quad (19F)$$

In order to decrease a combs' teeth 19 and 20 resolution, it is recommended to arrange the line modulator 3 in the point D for the maximum wavelength of light (red), and in the point F—for the minimum one (blue).

The physical period of the microrelief on the side of the prism is $$\Lambda_m = \lambda_m \sqrt{2} \quad (20)$$

or taking into account (19) for different wavelengths $$\Lambda_{mD} = \lambda_{mD}\sqrt{2} = \lambda_D\sqrt{2}(1/\theta - (5/6)(2N+1)/n) \quad (21D)$$

$$\Lambda_{mE} = \lambda_{mE}\sqrt{2} = \lambda_E\sqrt{2}(1/\theta - (3/6)(2N+1)/n) \quad (21E)$$

$$\Lambda_{mF} = \lambda_{mF}\sqrt{2} = \lambda_F\sqrt{2}(1/\theta - (1/6)(2N+1)/n) \quad (21F)$$

Taking into account (14), the focal distance of the lens in a plastic is $$f_p = t + w = p/3 + p(n/((2N+1)\theta) - 5/3) = p(n/((2N+1)\theta) - 4/3) \quad (22)$$

The focal distance of the lens in the air is $f = f_p/n$, $$f = f_p/n = p(1/((2N+1)\theta) - 4/(3n)) \quad (23)$$

At $\theta = 0.05$, $\lambda_D = 0.60$ μm, $\lambda_E = 0.45$ μm, $\lambda_F = 0.40$ μm, $p = 0.4$ mm, $n = 1.59$, $N = 3$
the rectangular sides of the prism are $t = p/3 = 0.133$ mm according to (9).

According to (14A), the overall height of the pixel is equal to $d=2p/3+w=p(n/((2N+1)\theta)-1)=1.417$ mm, According to (12), the size of the visualizing diaphragm is $h=p/(2N+1)=80$ μm, According to (21), the physical period of the microrelief on the sides of the prism is $\Lambda_m=\lambda_1(28.28-[5,3,1]*1.0377)$;

$\Lambda_{mD}=\lambda_D\sqrt{2(1/\theta-(5/6)(2N+1)/n)}=13.85$ μm(72.2 mm$^{-1}$) (red), $\Lambda_{mE}=\lambda_E\sqrt{2(1/\theta-(3/6)(2N+1)/n)}=11.33$ μm(88.3 mm$^{-1}$) (green), $\Lambda_{mF}=\lambda_F\sqrt{2(1/\theta-(1/6)(2N+1)/n)}=10.89$ μm(91.5 mm$^{-1}$) (blue).

According to (22), the focal distance of the lens in the plastic is $f_p=p(n/((2N+1)\theta)-4/3)=1.28$ mm.

According to the formula (21) and to the example it is obvious that in the given construction of the line element, the period of gratings is determined mainly by the angle of divergence and by the wavelength of light.

Thus, in the claimed electrooptical converter, the quality of the output signal on the device perceptioning this signal is higher, than in the prototype. Thus, the set of distinctive features of the electrooptical converter allows, under the modem technological level, to provide a device for a television information imaging, a recording device with the photosensitive carrier, the device for optical processing of an information, and also the different fiber-optic devices for control of the light fluxes.

Moreover, the functional, cost and operational expenses of the claimed electrooptical converter are lower, than the ones of the prototype.

What is claimed is:

1. An electrooptical converter, comprising sequentially located on the optical axis:
   at least one optical lighter,
   a transparent support or M transparent supports, each in the form of at least one plane-parallel plate or at least one prism of total internal reflection,
   at least one line modulator,
   at least one visualizer,
   a perception device, and
   at least one control device, wherein
   each line modulator comprises a transparent electroconducting layer applied to the transparent support, the electroconducting layer being covered with a transparent gel-like layer, and a system of i parallel ribbon control electrodes and ground electrodes, arranged in one plane on a second support corresponding to each of the line modulators and located with a gap above the transparent gel-like layer and electrically connected with the corresponding control device, wherein each transparent support together with the corresponding at least one modulator forms a line element; while the optical lighter consists of a lengthy light source and a lighting convertible lens sequentially located on the optical axis, and the visualizer includes a Fourier-objective and a visualizing diaphragm sequentially located on the optical axis; while the light source is pulse or continuous, and the frequency of light pulse recurrence is equal to the line frequency of the image; and
   the ribbon control electrodes are electrically connected to the periodic structure of control teeth, and the ground electrodes are electrically connected to the periodic structure of ground teeth, for each line pixel the teeth together with the corresponding electrodes look like two conducting combs isolated from each other, while the combs' teeth are located in parallel to the lengthy light source, while the location period of the pairs of the control teeth and ground teeth $\lambda_{teeth}$ is calculated from the relation: $\lambda_{teeth} \leq \sqrt{2}\ \lambda_{light}/\alpha_{div}$, wherein $\lambda_{light}$ is a wavelength of the lengthy light source and $\alpha_{div}$ (in radians) is a divergence of the radiation of the light source in a direction perpendicular to the combs' teeth.

2. The device according to claim 1, wherein at least one cylindrical objective which generatrix is parallel to the combs' teeth is inserted into the lighting convertible lens.

3. The device according to claim 1, wherein the visualizer contains at least one cylindrical objective which generatrix is parallel to the combs' teeth.

4. The device according to claim 1, wherein the perception device contains a projection lens, a system of mirrors, a means for vertical scanning of a line, a screen, and a photosensor of a scanner, while a toroidal-cylindrical objective is inserted into the projection lens.

5. The device according to claim 1, wherein the control device consists of the synchronization device which output is connected to a block of sources of voltage signals, and its input is connected to a photosensor of a scanner; the base voltage source which is located between the transparent electroconducting layer and the ground electrodes; the block of sources of voltage signals connected to i inputs of the control electrodes of the line modulator; a bias voltage source connected via electric source of corrections of the time front of relief formation by one output to the like outputs of the block of sources of voltage signals, and by the other output to the ground electrodes; while the synchronization device has two additional outputs, one of which is connected to the light source, and the other to the means of scanning of the line, and also has an additional input from the block of sources of voltage signals, while the electric source of corrections of the time front of relief formation is inserted sequentially with the bias voltage source and connected to the synchronization device, which at the moment of powering up the pulse signal applies an additional pulsing bias voltage of the time determined form, and a commutator switching polarity of a signal on the ribbon control and ground electrodes according to the given time-space rule is connected to the block of sources of voltage signals and to the synchronization device.

6. The device according to claim 1, wherein the system of the parallel ribbon control and ground electrodes is applied to the second support and is covered with a thin dielectric layer of a uniform thickness to which the combs' control teeth and ground teeth parallel to the lengthy light source are applied perpendicularly to the ribbon control and ground electrodes, and the control teeth are electrically connected by the contacts with the corresponding ribbon control electrodes, and the ground teeth are electrically connected by the contacts with the corresponding ribbon control electrodes, wherein the butt-ends of the teeth of one pixel are located opposite to butt-ends of the teeth of the other pixel with a gap, and the teeth are covered with a thin protective dielectric layer with adjustable electric parameters.

7. The device according to claim 1, wherein the system of the parallel ribbon control and ground electrodes is applied to the second support and is covered with a thin dielectric layer of a uniform thickness to which the combs' ground teeth are applied, the ground teeth are electrically connected by the contacts with the corresponding ribbon ground electrodes and are covered with a second thin protective dielectric layer of a uniform thickness, to which the combs' control teeth are applied, the control teeth are electrically connected by the contacts with the corresponding ribbon control electrodes, while in each pixel the butt-ends of the teeth are located opposite to spaces between the butt-ends of the neighbor pixel.

8. The device according to claim 1, wherein the perception device contains a projection lens, a system of mirrors, and a means for vertical scanning of a line; and
the device contains red, green and blue optical lighters and three control devices, corresponding to the red, green and blue optical lighters and connected electrically by the outputs with a color commutator connected by one output to each line modulator, by three outputs to three optical lighters sequentially switched on by it, and by fifth output to the means of scanning,
the transparent support is made in the form of at least one triangular prism of total internal reflection,
each line element contains three line modulators to be switched on simultaneously, each modulator has the period of order of the pairs of control teeth and ground teeth $\lambda_{teeth}$ corresponding to each of the three colors,
three optical lighters are arranged in parallel to each other, and the light flux of the corresponding color falls perpendicularly to the corresponding line modulator, while the light flux with the greater wavelength is directed to the line modulator, located a greater distance from a Fourier-objective, while an opaque visualizing diaphragm blocks or transmits radiation of the zero order of all three colors.

9. The device according to claim 1, wherein the device contains red, green and blue optical lighters and three control devices, corresponding to the red, green and blue optical lighters and connected electrically by the outputs with a color commutator connected by one output to each line modulator, by three outputs to three optical lighters sequentially switched on by it, and by the fifth output to the means of scanning, each line element contains three line modulators with three various spatial periods of order of the pairs of control teeth and ground teeth $\lambda_R, \lambda_G, \lambda_B$ corresponding to the waves of light of the red, the green and the blue optical lighters, while all three line modulators switched on sequentially in time are located on the optical axis in such a way that the line modulator with the greater wavelength is located a greater distance from a Fourier-objective.

10. The device according to claim 1, wherein each transparent support is made in the form of N triangular prisms with a rectangular triangle as the basis sequentially optically conjugated by the equal leg lateral sides, wherein the line modulators are applied to all or to some of the hypotenuse lateral sides; while one leg lateral side of the first prism has a free surface directed to at least one optical lighter, and one leg lateral side of the last prism has a free surface directed to at least one visualizer, while these sides are located perpendicularly to the optical axis, and the light from the optical lighter falls on all hypotenuse sides at an angle bigger than the angle of total internal reflection, and the line modulators have equal or different spatial frequencies of the combs' teeth.

11. The device according to claim 10, wherein the device comprises M line elements, arranged in the form of a linear matrix, the transparent support of each of the line elements consisting of an even number of prisms, wherein the first and the last free leg lateral sides of the line elements located in parallel planes or in one plane are directed correspondingly to the matrices of M monochrome, three-colored or multi-colored optical lighters and to the matrix of M monochrome, three-colored or multi-colored visualizers correspondingly.

12. The device according to claim 11, wherein the perception device is made in the form of a transparent or mat, or photosensitive, or thermo-sensitive material and is arranged after the matrix of visualizers on the optical axis.

13. The device according to claim 10, wherein the lengthy light source is designed in the form of an optical fiber or a matrix of optical fibers, by one side connected to a monochrome or polychrome laser light source of information and optically conjugated with the prism which is met first on the way of the light transmission by the other side, while each optical fiber is optically conjugated to one or several pixels of each line modulator, and the prism last met on the way of light transmission is conjugated to one visualizer or a matrix of visualizers, wherein an opaque visualizing diaphragm contains one hole or a matrix of holes with an aperture transmitting the zero order of light diffraction, while a objective is located on the optical axis after that hole or a matrix of holes at a distance less than focal one, and the objective focuses light on the output optical fiber connected on the other side to the perception device of the light information, and the signal voltage is applied to all line modulators synchronously, or in a three-phase time mode, or in a multiphase time mode, wherein said voltage is sufficient for creation of an optimum depth of the phase modulation equal to 4.82 radian, and the perception device is electrically connected to the optical lighter.

14. The device according to claim 10, wherein the lengthy light source is designed in the form of an optical fiber or a matrix of optical fibers, by one side connected to a monochrome or polychrome laser light source of information and optically conjugated with the prism which is met first on the way of the light transmission by the other side, while each optical fiber has an optical contact with one or several pixels of each line modulator, and the prism last met on the way of light transmission is conjugated to one visualizer or a matrix of visualizers, wherein a opaque visualizing diaphragm contains one hole or a matrix of holes with an aperture transmitting radiation of first and/or another higher order of light diffraction, controlled by pixel electrodes, while the visualizer for each line modulator is designed in such a manner that the objective is located against a hole or a matrix of holes, and the objective focuses light on the output optical fiber connected on the other side to the perception device of the light information, and the signal voltage is applied to all line modulators synchronously, or in a three-phase time mode, or in a multiphase time mode sufficient for creation of an optimum depth of the phase modulation equal to 4.82 radian, and the registration device of the light information is electrically connected to the optical lighter.

15. The device according to claim 10, wherein the optical lighter is arranged at an angle less than 90 degrees and the perception device is arranged at an angle of 90 degrees to the leg lateral side of the prism of the line element first met on the way of the light transmission, and the part of a visualizing diaphragm blocking light of zero order of diffraction is covered with a mirror and located in parallel to the leg lateral sides of the prism of the line element last met on the way of light transmission, while a second perception device or a light-absorbing device is located at the side of the visualizing diaphragm that is not covered with the mirror.

16. The device according to claim 10, wherein the combs' teeth of one or several line modulators in the line element are covered with a continuous thin dielectric mirror reflecting light of the corresponding wavelength, and one or all hypotenuse sides of prisms that do not contain line modulators (free sides) are covered with the mirror.

17. The device according to claim 15, wherein the last free leg lateral side of the prism of the line modulator is covered with the mirror.

18. An electrooptical converter, comprising:
  red, green and blue optical lighters,
  a transparent support in the form of at least one plane-parallel plate or at least one prism of total internal reflection,
  one line modulator,
  at least one visualizer,
  a perception device,
  three control devices corresponding to the red, green and blue optical lighters, wherein the control devices electrically connected by the outputs to the color commutator connected by one output to the line modulator, and by three outputs to three optical lighters sequentially switched on by it, and by the fifth output to the means of scanning, while the line modulator comprises the transparent electroconducting layer applied to the transparent support, the electroconducting layer being covered with a transparent gel-like layer, and a system of i parallel ribbon control electrodes and ground electrodes, applied to a second support in one plane and located with a gap above the transparent gel-like layer, wherein the line modulator together with the transparent support forms a line element and each optical lighter consists of the lengthy light source and the lighting convertible lens sequentially located on the optical axis, while the light source is pulse or continuous, and a frequency of light pulse recurrence is equal to the line frequency of the image;
  the visualizer includes a Fourier-objective and a visualizing diaphragm sequentially located on the optical axis; while a collinear flux of radiation of all three colors falls perpendicularly and sequentially in time onto the line element, and the ribbon control electrodes are electrically connected to the periodic structure of control teeth, and the ground electrodes are electrically connected to the periodic structure of ground teeth, for each line pixel the teeth together with the electrodes look like two conducting combs isolated from each other, while the combs' teeth are located in parallel to the lengthy light source, and a period of order for the pairs of control teeth and ground teeth $\lambda_{teeth}$ is determined according to the relation: $\lambda_{teeth} \leq \sqrt{2}\, \lambda_{light\ min}/\alpha_{div\ max}$, where $\alpha_{div\ max}$ is the greatest divergence of radiation among red, green and blue colors and $\lambda_{light\ min}$ is the minimum length of the light wave, while the size of an opaque visualizing diaphragm is determined according to the condition of overlapping of zero orders of all three colors, and the voltage on the control electrodes of the line modulator forms the necessary depth of the relief for each color.

19. An electrooptical converters, comprising:
  at least one optical lighter,
  one transparent support or M transparent supports, each in the form of at least one plane-parallel plate,
  at least one line modulator,
  at least one visualizer,
  a perception device, and further comprises
  at least one control device, wherein:
  each line modulator comprises a transparent electroconducting layer applied to the corresponding transparent support, the electroconducting layer being covered with a transparent gel-like layer, and a system of i parallel ribbon control electrodes and ground electrodes, applied in one plane to the second support corresponding to each line modulator and located with a gap above the transparent gel-like layer and electrically connected with the control device, wherein each transparent support together with corresponding at least one modulator forms a line element;
  the optical lighter consists of the lengthy light source and a lighting convertible lens sequentially located on the optical axis, and the visualizer includes a Fourier-objective and a visualizing diaphragm sequentially located on the optical axis;
  the light source is pulse or continuous, and the frequency of light pulse recurrence is equal to a line frequency of an image;
  the optical lighter is arranged in such a way that the radiation from it is directed to the plane-parallel plate, to the transparent electroconducting layer, to the transparent gel-like layer, to the air gap at an angle less than 90 degrees, while the ribbon control electrodes are electrically connected to the periodic structure of control teeth, and the ground electrodes are electrically connected to the periodic structure of ground teeth, wherein for each line pixel the teeth together with the electrodes look like two conducting combs isolated from each other, while the combs' teeth are located in parallel to the lengthy light source and are covered with a continuous thin dielectric mirror reflecting light of the corresponding wavelength, and the period of order for the pairs of control teeth and ground teeth $\lambda_{teeth}$ is determined according to the relation: $\lambda_{teeth} \leq \sqrt{2}\, \lambda_{light\ min}/\alpha_{div\ max}$, where $\lambda_{light}$ is a wavelength of the lengthy light source and $\alpha_{div}$ (in radians) is a divergence of the radiation of the light source in a direction perpendicular to the combs' teeth.

20. A gel-like layer for an electrooptical converter, comprising:
  100 mass parts polyvinylsiloxane $(CH_2\!=\!CH)_3 SiO[(CH_3)_2\, SiO]_m Si(CH\!=\!CH_2)_3$ with a molecular mass of 10000-16000 and viscosity of 800-1000 centistokes;
  15-25 mass parts oligohydridesiloxane $(CH_3)_3 SiO\{[(CH_3)_2\, SiO][CH_3SiO(H)]\}Si(CH_3)_3$ as a cross-linking agent, with hydride groups content of 10-15% and viscosity of 50-100 centistokes;
  150-300 mass parts polymethylsiloxane fluid $(CH_3)_3 SiO[(CH_3)_2 SiO]Si(CH_3)_3$ as a plasticizer with viscosity of 5-20 centistokes; and
  0.3-2 mass parts 0.1% solution of chloroplatinic acid in an organic solvent or its complex with tetravinylsilane as a catalyst of hardening.

21. A method of preparation of the gel-like layer for the electrooptical converter, comprising:
  mixing 100 mass parts of polyvinylsiloxane $(CH_2\!=\!CH)_3 SiO[(CH_3)_2 SiO]_m Si(CH\!=\!CH_2)_3$ with a molecular mass of 10000-16000 and viscosity of 800-1000 centistokes with 15-25 mass parts of oligohydridesiloxane $(CH_3)_3 SiO\{[(CH_3)_2 SiO][CH_3SiO(H)]\}Si(CH_3)_3$ with hydride groups content of 10-15% and viscosity of 50-100 centistokes; and
  adding 150-300 mass parts of polymethylsiloxane fluid $(CH_3)_3 SiO[(CH_3)_2 SiO]Si(CH_3)_3$ with viscosity of 5-20 centistokes after the end of mixing, then after repeating mixing, 0.3-2 mass parts of 0.1% solution of chloroplatinic acid in an organic solvent or its complex with tetravinylsilane is added,
  mixing the resulting composition and
  applying the resulting composition to the electroconducting transparent layer as a layer of a uniform thickness.

22. The method according to claim 21, wherein the composition is applied to the electroconducting transparent layer on the expiration of 1-20 minutes after the end of mixing.

23. The method according to claim 21, wherein the resulting composition is applied to the electroconducting transparent layer as a layer of a uniform thickness after the end of mixing in the following way: by forming, cross-linking and cooling of a first layer, then by applying one or more additional gel layers on the first or a previous cross-linked and cooled gel layer.

24. A method of preparation of the gel-like layer for the electrooptical converter, comprising:

mixing 100 mass parts of polyvinylsiloxane $(CH_2=CH)_3$ $SiO[(CH_3)_2SiO]_mSi(CH=CH_2)_3$ with molecular mass of 10000-16000 and viscosity of 800-1000 centistokes with 15-25 mass parts of oligohydridesiloxane $(CH_3)_3$ $SiO\{[(CH_3)_2SiO][CH_3SiO(H)]\}Si(CH_3)_3$ with hydride groups content of 10-15% and viscosity of 50-100 centistokes, adding 150-300 mass parts of polymethylsiloxane fluid $(CH_3)_3SiO[(CH_3)_2SiO]Si(CH_3)_3$ with a viscosity of 5-20 centistokes after the end of mixing, mixing and adding 0.3-2 mass parts of 0.1% solution of chloroplatinic acid in an organic solvent or its complex with tetravinylsilane, then mixing the resulting composition and applied to an electroconducting transparent layer as a layer of a uniform thickness after the end of mixing, covering the obtained layer with an additional plate with an optical flat surface, and the thickness of the transparent gel-like layer is flattened by main spacers, arranged between the transparent electroconducting layer and the additional plate, placing the obtained construction into an oven and kept at a temperature of 70-90° C. for about 2-4 hours, separating the additional plate, and covering the gel-like layer with a second support with the control electrodes and ground electrodes applied to it, wherein the electrodes are covered with a thin protective dielectric layer, while a gap is assigned by additional spacers, which are bigger than the main spacers.

25. The method according to claim 24, wherein the resulting composition is applied to the electroconducting transparent layer as a layer of a uniform thickness after the end of mixing in the following way: by forming, cross-linking and cooling of a first layer, then by applying one or more additional gel layers on the first or a previous cross-linked and cooled gel layer.

26. The method according to claim 24, wherein the additional plate is covered with an antiadhesive layer.

27. The method according to claim 26, wherein a surface-active substance is used as the antiadhesive layer.

28. The method according to claim 24, wherein the additional plate is treated with plasma or another clearing irradiation.

29. A method of preparation of the gel-like layer for the electrooptical converter, comprising:

mixing 100 mass parts of polyvinylsiloxane $(CH_2=CH)_3$ $SiO[(CH_3)_2SiO]_mSi(CH=CH_2)_3$ with molecular mass of 10000-16000 and viscosity of 800-1000 centistokes with 15-25 mass parts of oligohydridesiloxane $(CH_3)_3$ $SiO\{[(CH_3)_2SiO][CH_3SiO(H)]\}Si(CH_3)_3$ with hydride groups content of 10-15% and viscosity of 50-100 centistokes, adding 150-300 mass parts of polymethylsiloxane fluid $(CH_3)_3SiO[(CH_3)_2SiO]Si(CH_3)_3$ with viscosity of 5-20 centistokes after the end of mixing, mixing and adding 0.3-2 mass parts of 0.1% solution of chloroplatinic acid in an organic solvent or its complex with tetravinylsilane, mixing the resulting composition and applying the composition to an electroconducting transparent layer as a layer of a uniform thickness after the end of mixing, covering the obtained layer with an additional plate with an optical flat surface, wherein the thickness of the transparent gel-like layer is flattened by main spacers, arranged between the transparent electroconducting layer and the additional plate, placing the obtained construction into an oven and kept at a temperature of 70-90° C. for about 1-2 hours, cooling the construction ambient temperature, separating the additional plate, placing the gel-like layer located on the transparent electroconducting layer into the oven and kept at the temperature of 70-90° C. up to complete cross-linking of the gel for about 1-3 hours.

30. The method according to claim 29, wherein the resulting composition is applied to the electroconducting transparent layer as a layer of a uniform thickness after the end of mixing in the following way: by forming, cross-linking and cooling of a first layer, then by applying one or more additional gel layers on the first or a previous cross-linked and cooled gel layer.

31. The method according to claim 29, wherein the additional plate is covered with an antiadhesive layer.

32. The method according to claim 31, wherein a surface-active substance is used as the antiadhesive layer.

33. The method according to claim 29, wherein the additional plate is treated with plasma or another clearing irradiation.

34. A method of preparation of a gel-like layer for an electrooptical converter, comprising:

mixing 100 mass parts of polyvinylsiloxane $(CH_2=CH)_3$ $SiO[(CH_3)_2SiO]_mSi(CH=CH_2)_3$ with molecular mass of 10000-16000 and viscosity of 800-1000 centistokes with 15-25 mass parts of oligohydridesiloxane $(CH_3)_3$ $SiO\{[(CH_3)_2SiO][CH_3SiO(H)]\}Si(CH_3)_3$ with hydride groups content of 10-15% and viscosity of 50-100 centistokes, adding 150-300 mass parts of polymethylsiloxane fluid $(CH_3)_3SiO[(CH_3)_2SiO]Si(CH_3)_3$ with viscosity of 5-20 centistokes after the end of mixing, mixing and adding 0.3-2 mass parts of 0.1% solution of chloroplatinic acid in an organic solvent or its complex with tetravinylsilane, mixing the resulting composition and applying the composition to an electroconducting transparent layer as a layer of a uniform thickness after the end of mixing, covering the obtained layer with an additional plate with an optical flat surface, wherein the thickness of the transparent gel-like layer is flattened by main spacers, arranged between the transparent electroconducting layer and the additional plate, placing the obtained construction into an oven and kept at a temperature of 70-90° C. for about 2-4 hours, separating the additional plate, covering the gel-like layer with a second support with control electrodes and ground electrodes applied to it, wherein the electrodes are covered with a thin protective dielectric layer, while a gap is assigned by the main spacers after complete cross-linking, contraction and cooling of the gel down to ambient temperature.

35. The method according to claim 34, wherein the resulting composition is applied to the electroconducting transparent layer as a layer of a uniform thickness after the end of mixing in the following way: by forming, cross-linking and cooling of a first layer, then by applying of one or more additional gel layers on the first or a previous cross-linked and cooled gel layer.

36. The method according to claim 34, wherein the additional plate is covered with an antiadhesive layer.

37. The method according to claim 36, wherein a surface-active substance is used as the antiadhesive layer.

38. The method according to claim 34, wherein the additional plate is treated with plasma or another clearing irradiation.

39. A method of preparation of a gel-like layer for an electrooptical converters, comprising:
mixing 100 mass parts of polyvinylsiloxane $(CH_2=CH)_3SiO[(CH_3)_2SiO]_mSi(CH=CH_2)_3$ with molecular mass of 10000-16000 and viscosity of 800-1000 centistokes with 15-25 mass parts of oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes,
adding 150-300 mass parts of polymethylsiloxane fluid $(CH_3)_3SiO[(CH_3)_2SiO]Si(CH_3)_3$ with viscosity of 5-20 centistokes after the end of mixing,
mixing and adding 0.3-2 mass parts of 0.1% solution of chloroplatinic acid in an organic solvent or its complex with tetravinylsilane,
mixing the resulting composition and applying the composition to an electroconducting transparent layer as a layer of a uniform thickness after the end of mixing,
covering the obtained layer with an additional plate with an optical flat surface, wherein the thickness of the transparent gel-like layer is flattened by main spacers, arranged between the transparent electroconducting layer and the additional plate,
placing the obtained construction into an oven and kept at a temperature of 70-90° C. for about 1-2 hours,
cooling the construction to ambient temperature,
separating the additional plate,
placing the gel-like layer located on the transparent electroconducting layer into the oven and kept at the temperature of 70-90° C. up to complete cross-linking of the gel for about 1-3 hours, wherein the gap is assigned by the main spacers after complete cross-linking, contraction and cooling of the gel down to ambient temperature.

40. The method according to claim 39, wherein the resulting composition is applied to the electroconducting transparent layer as a layer of a uniform thickness after the end of mixing in the following way: by forming, cross-linking and cooling of a first layer, then by applying one or more additional gel layers on the first or a previous cross-linked and cooled gel layer.

41. The method according to claim 39, wherein the additional plate is covered with an antiadhesive layer.

42. The method according to claim 41, wherein a surface-active substance is used as the antiadhesive layer.

43. The method according to claim 39, wherein the additional plate is treated with plasma or another clearing irradiation.

44. A composition for a gel-like layer for an electrooptical converter, comprising:
polyvinylsiloxane $(CH_2=CH)_3SiO[(CH_3)_2SiO]_mSi(CH=CH_2)_3$ with molecular mass of 10000-16000 and viscosity of 800-1000 centistokes;
oligohydridesiloxane $(CH_3)_3SiO\{[(CH_3)_2SiO][CH_3SiO(H)]\}Si(CH_3)_3$ as a cross-linking agent with hydride groups content of 10-15% and viscosity of 50-100 centistokes;
polymethylsiloxane fluid $(CH_3)_3SiO[(CH_3)_2SiO]Si(CH_3)_3$ as a plasticizer with viscosity of 5-20 centistokes; and
0.1% solution of chloroplatinic acid in an organic solvent or its complex with tetravinylsilane as a catalyst of hardening, having the following ratio of the mixture's components (mass parts): polyvinylsiloxane—100, oligohydridesiloxane—15-25, polymethylsiloxane fluid—150-300, and 0.1% solution of chloroplatinic acid in the organic solvent or its complex with tetravinylsilane—0.3-2.

45. The electrooptical converter of claim 1, wherein the gel-like layer comprises polyvinylsiloxane $(CH_2=CH)_3SiO[(CH_3)_2SiO]_mSi(CH=CH_2)_3$ with molecular mass of 10000-16000 and viscosity of 800-1000 centistokes and oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes.

46. The electrooptical converter of claim 18, wherein the gel-like layer comprises polyvinylsiloxane $(CH_2=CH)_3SiO[(CH_3)_2SiO]_mSi(CH=CH_2)_3$ with molecular mass of 10000-16000 and viscosity of 800-1000 centistokes and oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes.

47. The electrooptical converter of claim 19, wherein the gel-like layer comprises polyvinylsiloxane $(CH_2=CH)_3SiO[(CH_3)_2SiO]_mSi(CH=CH_2)_3$ with molecular mass of 10000-16000 and viscosity of 800-1000 centistokes and oligohydridesiloxane $(CH_3)_3SiO\{[(CH_3)_2SiO][CH_3SiO(H)]\}Si(CH_3)_3$ with hydride groups content of 10-15% and viscosity of 50-100 centistokes.

48. The method according to claim 27, wherein the surface-active substance is sulfanol-π.

49. The method according to claim 32, wherein the surface-active substance is sulfanol-π.

50. The method according to claim 37, wherein the surface-active substance is sulfanol-π.

51. The method according to claim 42, wherein the surface-active substance is sulfanol-π.

52. The device according to claim 16, wherein the last free leg lateral side of the prism of the line modulator is covered with the mirror.

* * * * *